United States Patent [19]

Jourdain et al.

[11] Patent Number: 5,593,278
[45] Date of Patent: Jan. 14, 1997

[54] GAS TURBINE ENGINE ROTOR BLADING SEALING DEVICE

[75] Inventors: Gerard E. A. Jourdain, Saintry sur Seine; Jean-Paul Lagrange, Le Chatelet en Brie; Gerard M. F. Mandet, Fericy; Jacques H. Mouchel, Paris; Jean-Philippe E. Richard, Saint-Medard en Jalles; Marcel R. Soligny, Chevilly-LaRue, all of France

[73] Assignee: Societe National d'Etude et de Construction de Moteurs d'Aviation S.N.E.C.M.A., Paris Cedex, France

[21] Appl. No.: 568,223

[22] Filed: Dec. 30, 1983

[30] Foreign Application Priority Data

Dec. 31, 1982 [FR] France .................................. 82 22166
Jul. 12, 1983 [FR] France .................................. 83 11583
Jul. 12, 1983 [FR] France .................................. 83 11584

[51] Int. Cl.⁶ .................................................. F01D 11/08
[52] U.S. Cl. ..................................... 415/173.2; 415/116
[58] Field of Search .................................. 60/39.02, 204, 60/226.1, 39.75; 415/127, 128, 126, 136, 116, 138, 178, 173.2; 416/204 R, 204 A, 205

[56] References Cited

U.S. PATENT DOCUMENTS

| 4,050,843 | 9/1977 | Needham | 415/136 |
| 4,304,093 | 12/1981 | Schulze | 60/39.75 |
| 4,363,599 | 12/1982 | Cline | 415/136 |
| 4,487,016 | 12/1984 | Schwarz | 60/204 |
| 4,513,567 | 4/1985 | Deveau | 60/39.02 |

FOREIGN PATENT DOCUMENTS

| 2467292 | 10/1979 | France . |
| 2450344 | 2/1980 | France . |
| 2450345 | 2/1980 | France . |

Primary Examiner—Stephen C. Bentley
Attorney, Agent, or Firm—Bacon & Thomas

[57] ABSTRACT

The disclosed invention relates to a sealing device for the rotor blades of a gas turbine engine which permits real time adjustment to be made of the clearances between the rotor blade tips and the sealing structure. The sealing shroud around the turbine wheel is formed of sectors, each sector being attached to a monolithic short response time ring and a monolithic long response time ring. Ventilating air from upstream of the turbine wheel is directed onto the rings such that the sectors are caused to radially expand or contract in compliance with the expansion or contraction of the tips of the rotor blades during stabilized and transient engine operational modes. A small positive clearance between the sealing sectors and the blade tips is maintained throughout the range of the engine's operation.

34 Claims, 15 Drawing Sheets

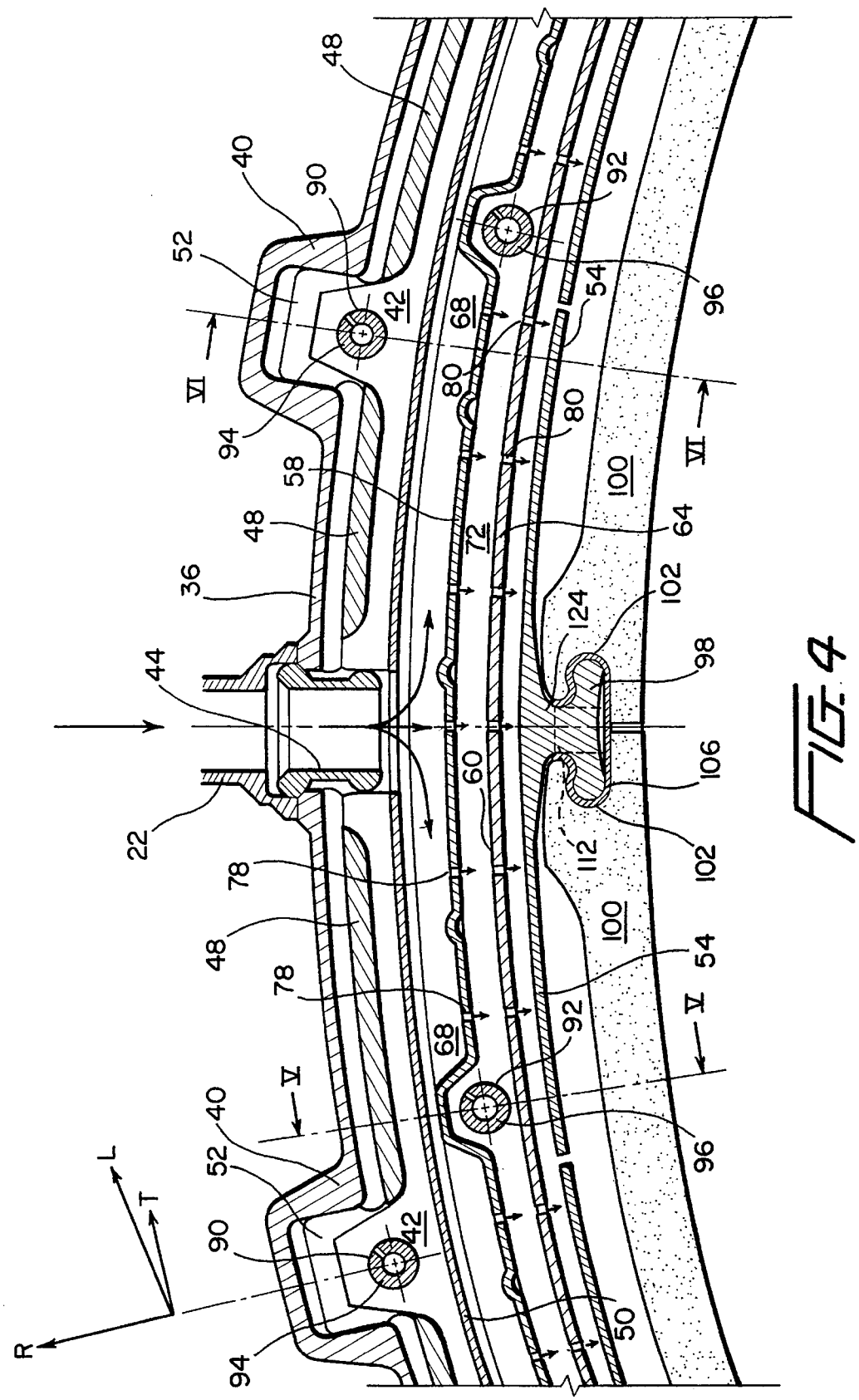

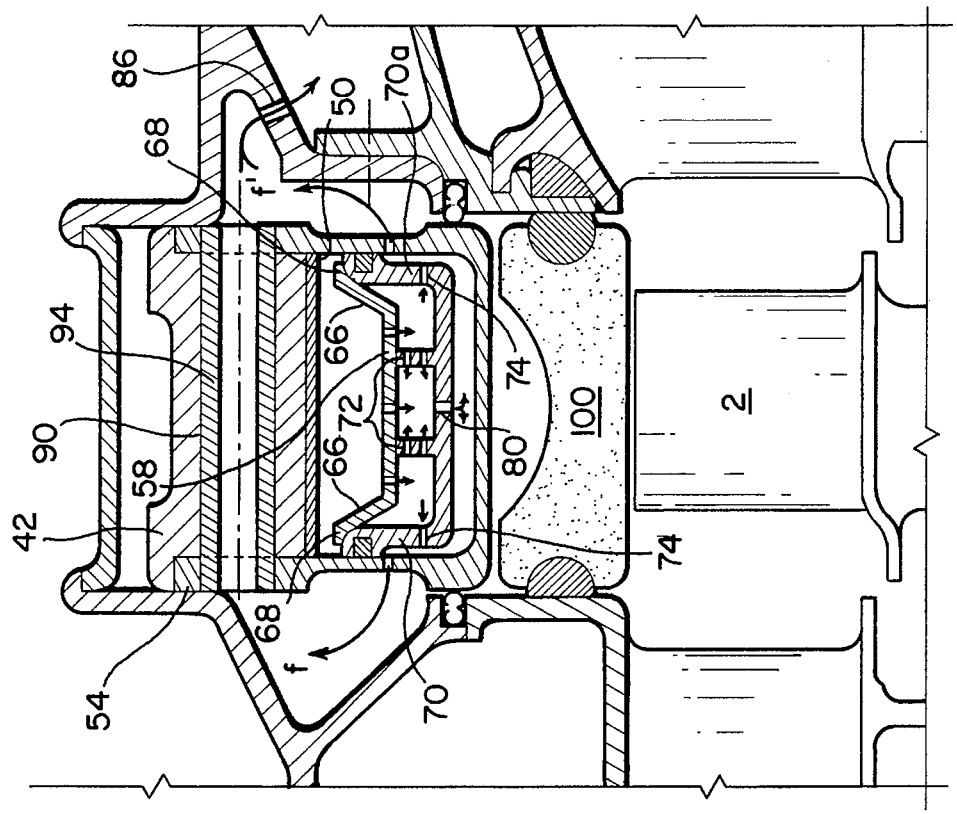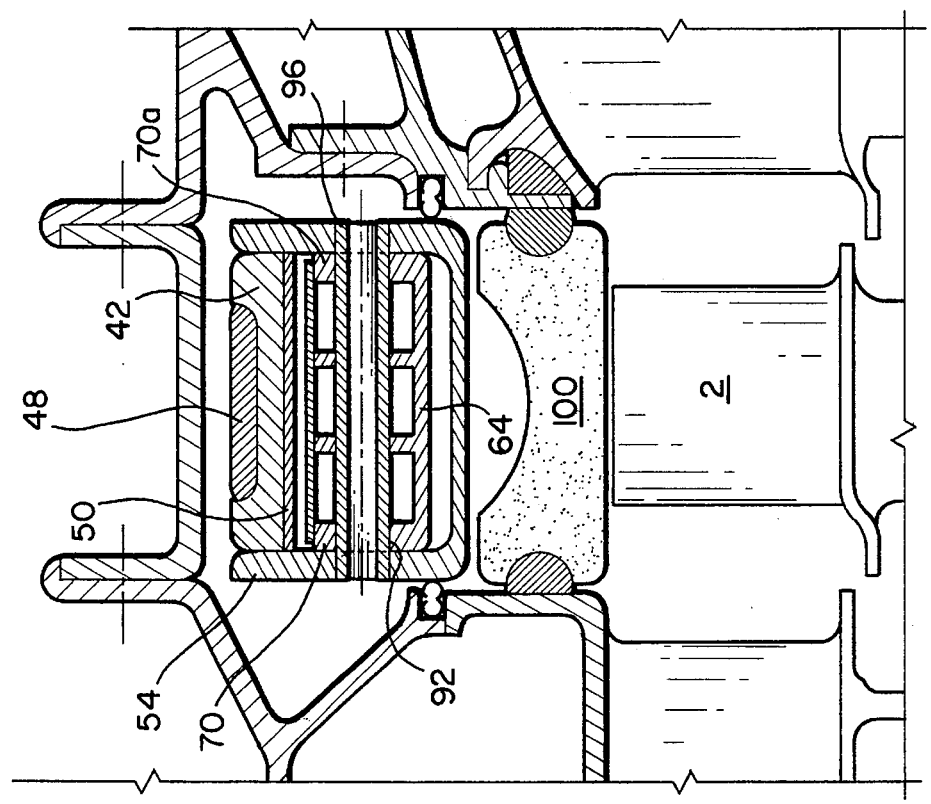

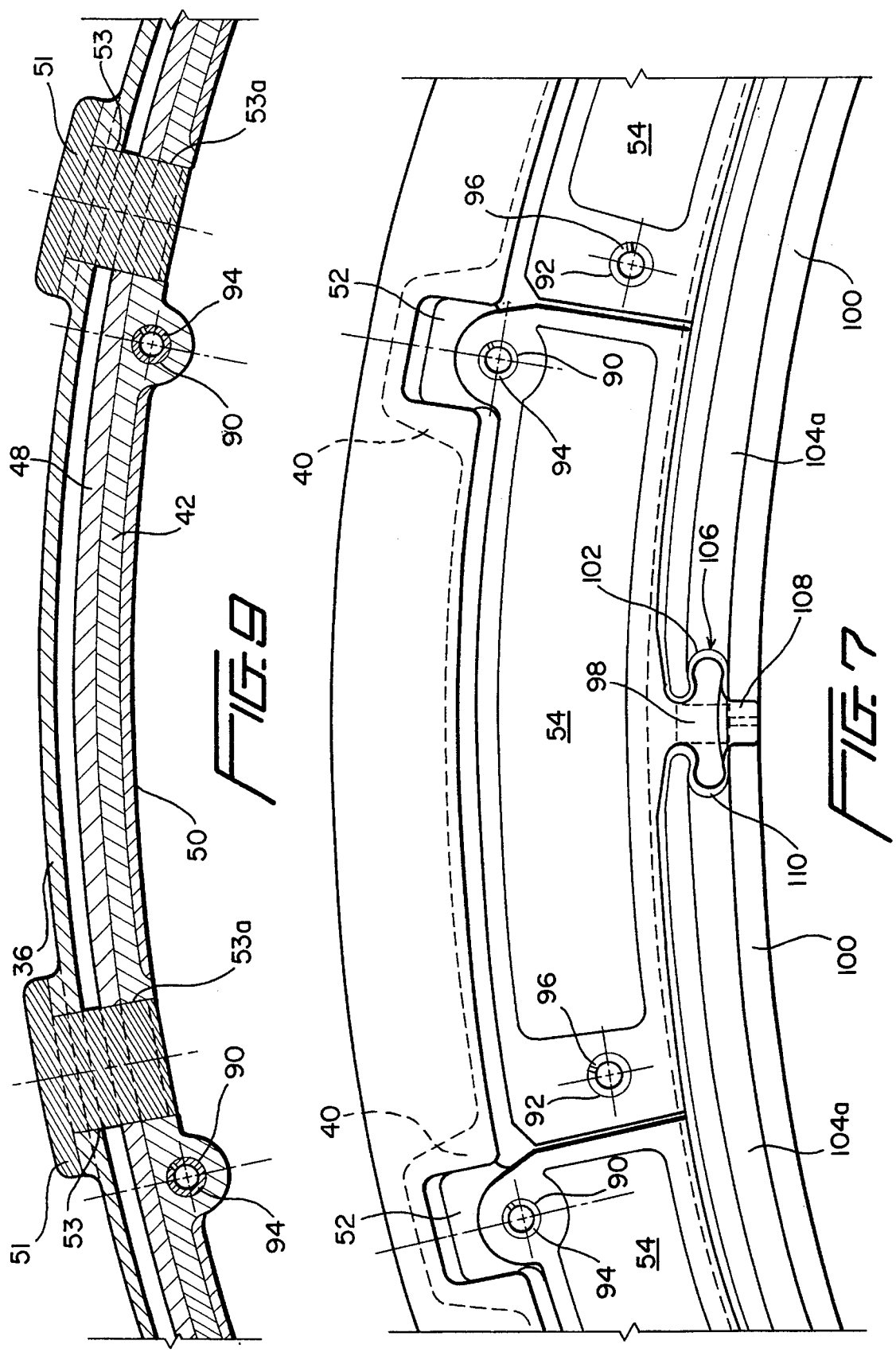

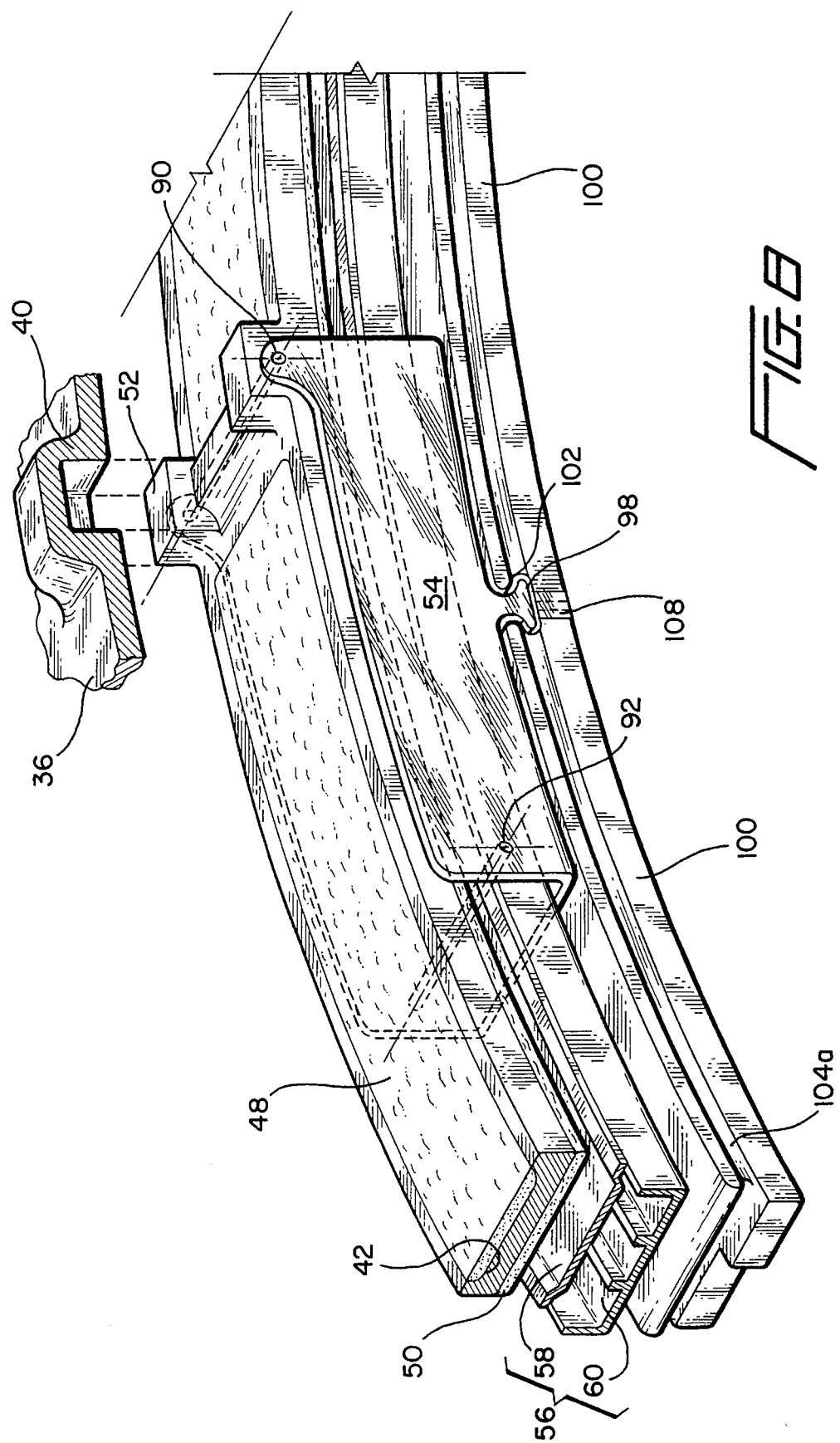

1

GAS TURBINE ENGINE ROTOR BLADING SEALING DEVICE

BACKGROUND OF THE INVENTION

1. Field of the Invention

The invention relates to a gas turbine engine rotor blading sealing device permitting a real time adjustment to be made of clearances between the rotor blade tips and the stationary surrounding structure. The invention also defines a method for determining if the sealing device conforms to its intended function.

2. Brief Description of the Prior Art

It is important to reduce fluid leaks between the rotating and fixed parts of a gas turbine engine, particularly in relation to the turbine, since they affect the efficiency, the maximum power and the resistance to hunting of the engine.

In order to reduce these clearances and, correspondingly, the leaks, whether the engine is operating in a stabilized or transient mode, it is necessary to meet certain conditions, some of which are incompatible with the others. These conditions involve the concentricity of the tips of the blades, or of their peripheral roots, and the concentricity of the sealing device with the rotational axis of the gas turbine engine; the undeformability of the device (i.e. its ability to resist deformation from a circular cross section); the increase or decrease in the radius of the sealing device with the increase or decrease in the radius of the blade tips or their peripheral roots, under the effect of centrifugal and thermal expansions, whether stabilized or transient.

It is a relatively simple matter to insure that the tip of the rotating parts (blade tips or peripheral roots) describes a surface of revolution. This can be accomplished by machining the blades or the roots to a predetermined length by grinding on a rotating blades wheel. However, it is much more difficult to provide a shroud surrounding the rotating parts with a form of revolution capable of withstanding the different operating conditions. Particular factors which render this difficult are the thermal deformations caused by changes in the operating temperature of the engine and inertial forces (load factors in the Z or Y direction in particular) caused by the variations in operating rpms. It is also necessary that the shroud be impervious, that it remains perfectly centered on the axis of rotation of the gas turbine engine, and that it resists deformation and maintain its circular cross section. These factors make it obligatory that the shroud be designed as a monolithic structure having adequate inertia, or as a more complicated system having means to ensure the concentricity of the supports of the shroud sectors in relation to the engine axis and the complete absence of any ovalness.

It these conditions are not met and the shroud assumes a degree of ovalness or eccentricity such that the maximum distance inward between a circle of the same developed length and the interior part of the oval shaped (or eccentric) shroud closest to the blade tips (or to the segment supports) with maximum ovalness (or eccentricity) is designated by "a", is necessary to incorporate into the design:

- a clearance greater than or equal to "a" under design operating conditions; or,
- a packing of minimal thickness, equal to "a" that will be locally removed by abrasion upon the appearance of the maximum ovalness (or eccentricity) "a", thus forming a leak area through a clearance that is locally equal to "a". In all likelihood, this leak area will extend around the entire periphery of the shroud since the ovalness (or eccentricity) can occur at different times along different axes.

Means are known to have the casing supporting the shroud well centered with respect to the axis of the gas turbine engine, as described by the applicants in their patent application Ser. No. 81.20719 filed on Nov. 5, 1981. Means are also known to center the shroud in the casing and to give it sufficient inertia such that its deformation into an oval shape is practically negligible. However, ideal sealing shrouds should ensure that, under all operating conditions, particularly the transient conditions from idle speed to full throttle and vice versa, the radial dimensions of the shroud or the shroud sectors maintain a small, positive clearance between the blade tips (or their peripheral roots) and the shroud or shroud sectors.

In the following explanation, for reasons of simplification, reference shall be made to a structure in which the rotor blades do not have peripheral roots, but it should be understood that the term "blade tip" includes the radial tip of the peripheral roots of the blades when the blades have such peripheral roots.

The first difficulty that is encountered in designing an effective sealing shroud relates to the fact that the dimension of the shroud must be adjusted in order to prevent or minimize leaks through all modes of the engine operation from rest, through idling speed to maximum speed. If $r_o$ is the sum of the radius of the turbine wheel plus the adjusted length of the blades at rest, the radial position of the blade tip for a stabilized idling speed (assuming for the sake of simplification that the blade tips sweep a cylinder and not some other form of revolution):

$r_r = r_o$ + centrifugal expansion of the wheel at idling speed ($dcd_r$)
+ centrifugal expansion of the blades at idling speed ($dca_r$)
+ thermal expansion of the wheel at idling speed ($dtd_r$)
+ thermal expansion of the blades at idling speed ($dta_r$)

and, for the maximum stabilized mode, replacing subscript r for idling speed by subscript m for maximum $$r_m = r_o + dcd_m + dca_m + dtd_m + dta_m$$

and doing the same for any intermediate mode (indicated by subscript i)

$$r_i = r_o + dcd_i + dca_i + dtd_i + dta_i$$

It is for these respective radii, $r_r$, $r_m$ and $r_i$ that it is necessary to adjust the inside dimension of the shroud to maintain the clearance as small as possible.

If the shroud is a monolithic structure having sufficient inertia to maintain its concentricity about the engine axis and to maintain its circular configuration, the simplest way of causing the inside radius of the shroud or shroud sectors to vary, is to vary its temperature. This may be accomplished by selecting the shroud material to have a coefficient of thermal expansion $\alpha$ such that a very small positive clearance may be maintained under different stabilized conditions by directing heated air taken from an appropriate stage of the gas turbine engine compressor onto the shroud structure.

Many ways of accomplishing this are known, a typical examples of which is shown in French Patent 2,467,292. None of the prior art, however, has completely resolved the problem even when the operating mode of the engine is stabilized. These known means simple encompass an air distribution mechanism which may be adjusted for flow and/or temperature variations to direct heated air onto the shroud structure in order to vary its temperature thereby maintaining a small clearance.

While these systems can theoretically be made, they are extremely complicated and their reliability in everyday usage is quite problematical. In some cases, breakdown of the air distribution mechanism is capable of causing significant damage to the turbine assembly and/or the shroud. A more serious defect of these known systems is that they do not account for factors which will maintain the appropriate blade tip clearances during transition from one operational mode to another. To be completely effective, a shroud sealing system must have a response which adjusts to the response of the radial displacement of the blade tip due to the expansion or contraction of the rotor during the transition of the engine from one operation mode to another.

The use of these prior art devices during rapid deceleration of the gas turbine engine, such as that often required of the engine in aviation usage, would result in an increase in the clearance until the shroud structure has had a chance to stabilize at a new, lower temperature. The periods of rapid deceleration and acceleration are on the order of six seconds in typical aviation usage. During this transient period, there is a radial displacement of the blade tips inwardly due to the decrease in centrifugal forces acting on the blades and the wheel. This radial displacement is equal to $(dcd_m-dcd_r)+(dca_m-dca_r)$. Obviously, if the radius of the shroud carrying the sealing sectors has not varied, the clearance between it and the blade tips would increase until the temperature of the shroud could be stabilized at the new operating mode.

The time period of six seconds will be used in describing the transient modes for both acceleration and deceleration of the rotating parts of the engine, but obviously the invention encompasses longer or shorter acceleration or deceleration times.

In approximately the same period of time that it takes for the engine to decelerate as noted above, the gases driving the turbine wheel, the fluid cooling the wheel, and the fluid cooling the interior of the turbine blades enable the wheel and blades to reach their corresponding idling speed temperatures. The following analysis will disregard the heating of the ventilating air as a result of the thermal inertia of those parts in contact with these fluids, such as piping, enclosures, etc. This results in a thermal contraction of the blade $(dta_m-dta_r)$ that is added to the contraction $(dcd_m-dcd_r+dca_m-dca_r)$ due to the reduction in the centrifugal forces. It must be pointed out, however, that responses, as a function of time, of the respective thermal expansions and contractions of the blade and wheel, indeed even the different parts of the wheel, are very different. To simplify the analysis, the following will only be concerned with the time that it takes one of these members to acquire a thermal expansion (or contraction) equal to 98% of its final expansion (or contraction) to a completely stabilized mode. This will be referred to as the "98% response time" or simply the "response time".

A value that is characteristic of this response time for a modern turbine blade design is on the order of a few seconds. Contrasted to this, the turbine wheel, because of its considerably larger thermal inertia takes on the order of fifty times longer (and in some cases even longer) to reach its quasi stabilized temperature. The relatively thin rim part of the turbine wheel (which is still thicker than the turbine blades) will reheat relatively quickly during acceleration since it is the direct recipient of the flow of heat from the turbine blades. The central portion of the turbine wheel which is generally much thicker, takes longer to reheat and, thus its response time is greater than the rim or the blades. The response time for the turbine wheel will be defined as the time it takes the wheel to reach its 98% thermal expansion (or contraction) value in a completely stabilized mode.

The known prior art devices do not enable the shroud structure to make a "real time" adjustment to centrifugal and thermal expansion of the turbine blade wheel. If the shroud structure carrying the seal sectors is designed to have the same response time as the wheel (by properly choosing its dimensions and heat insulation, for example) during the sudden deceleration noted above, the clearance between the blade tips and the shroud seal will be increased by a dimension equal to:

$$dcd_m+dca_m+dta_m-dcd_r-dca_r-dta_r$$

This increase in clearance is not critical since it applies only to a transient operation during which time there is no wear of the sealing material. After thermal contraction of the turbine wheel occurs, the stabilized idling speed radius is equal to:

$$r_o+dcd_m-dcd_r+dca_m-dca_r+dta_m-dta_r+dtd_m-dtd_r$$

By using the prior art devices, it is possible to provide a very small positive clearance between the blade tips and the shroud during the stabilized idling speed and the stabilized maximum speed mode by a judicious choice of the shroud material, particularly with respect to its coefficient of thermal expansion $\alpha$. However, the clearance would become a negative value during sudden acceleration of the turbine blade wheel thereby causing breakage of the blades or significant wear of the abradable seal material. During the rapid acceleration (within a period of approximately seven seconds) the radius of the blades will be equal:

$$dcd_m-dcd_r+dca_m-dca_r+dta_m-dta_r$$

This increase can be on the order of 1.5 millemeters or greater. An increase of this magnitude at the same time that the radius of the shroud has not begun to expand will result in severe damage to the engine.

Even if the turbine blade tips are not damaged, they will abrade the shroud sealing material, resulting in an enlarged clearance after the shroud has expanded and stabilized. Once the seal material has been abraded away, the enlarged clearances will remain under other operating conditions.

If the shroud structure has been designed in conjunction with the characteristics of its ventilation air to have the same response time as the engine itself during acceleration and/or deceleration approximately equal to the centrifugal expansion/contraction response time of the wheel and blade plus the thermal expansion/contraction of the blade, it is by going from full stabilized throttle that a sudden reduction would result in negative clearance, to the reduced value $dtd_m-dtd_r$ for the clearance at the outset for the stabilized maximum. This negative clearance would abrade a layer of the seal element (on the order of 2.5 millimeters) resulting in a clearance that would remain in subsequent operation modes.

It is possible to refine the air distribution system further such that is responds approximately in real time to the double response time curve for the radius of the blade tips as shown in FIG. 1 (acceleration being above the time axis and deceleration being below the time axis). However, this results in an increase in complexity, mass, and cost, and a decrease in the reliability of the system. Furthermore, the piping must be designed for the maximum ventilation flow which would influence the temperature of the shroud structure during the first phase of starting and the temperature of the wheel and turbine blades.

Attempts to solve the problems posed by the necessity of the shroud structure and sealing sectors having to respond to the double response time curve, shown in FIG. 1, are known and typical examples are illustrated in French Patents 2,450,344 and 2,450,345. The arrangement provided for in these patents are applicable only to low-powered gas turbine engines with reverse flow combustion chambers. The principles set forth in these examples of the prior art could possibly be adapted to direct flow combustion chambers for high-powered gas turbine engines, but they would be extremely expensive and unrealistically complicated.

The solution to the problems set forth in the French patents noted above involves the use of a flexible sleeve, one that can deform when subjected to stresses. This solution presents the risk and disadvantages of introducing defects in the concentricity and ovalness of the shroud structure, particularly under the effect of load factors encountered in flight. As previously discussed, the exact concentricity of the shroud structure with respect to the axis of rotation of the engine and the absence of any ovalness of the shroud structure and sealing sectors are primary considerations for any successful sealing system. The systems set forth in the French patents noted above do not satisfactorily meet these criteria. It is also noted that due to the considerable hyperstatic stresses brought into play by the seizures in a segmented ring as set forth in French Patent 2,450,345, the least heterogeneity in temperature or inertia in the peripheral direction will cause significant deformations of the segmented ring.

SUMMARY OF THE INVENTION

The instant invention provides an apparatus for insuring the real time maintenance of clearances between the rotor blade tips and the sealing sectors of the shroud structure while at the same time maintaining the concentricity of the sealing sectors to the rotational axis of the turbine and keeping the sectors in a perfect circular cross section (no ovalness).

It is an object of the present invention to insure this clearance is maintained by direct delivery of air from one of the last stages of the engine compressor through an uncomplex, realistic and reliable distributor.

A further objective of the present invention is to obtain these results with a relatively reduced air flow to maintain the efficiency of the gas turbine engine.

It is a further objective of the present invention to insure that the sealing sectors do not leak at their junctures nor between them and the support structure of the shroud so as to minimize engine fluid leaks.

The rotor blade sealing device accomplishing these objectives is generally of the same type as those previously cited and comprises a sealing or packing element made up of a plurality of sectors connected to a first structure and to a second structure having circular sections. The structures are coaxially oriented and generally coplanar with one structure being external to the other structure. An assembly of support members attaches the sectors to the first structure and comprises a plurality of displacement elements, all similarly constructed, and distributed peripherally about the sectors. Each of these support elements has a double tenon for holding the adjacent sectors in position.

The displacement elements are isostatically supported by first and second hinges: the first hinge attaching the displacement elements to the rigid first structure having a circular section and homogeneous mechanical characteristics about its periphery and coaxially located with respect to the rotational axis of the gas turbine engine under all operating conditions, the first structure being heavily ventilated by air taken from the compressor stage of the gas turbine engine; and a second hinge connecting the displacement element to the second rigid structure having a circular section and homogeneous mechanical characteristics about its periphery and being ventilated by the air removed from the compressor stage of the engine, but with greater thermal inertia than the aforementioned first structure. The first and second hinges are circumferentially displaced about the periphery of the device in order to avoid the introduction of hyperstatic forces.

The peripheral location of the double tenons on the displacement elements is determined by the thermal coefficients of expansion of the first and second structures ($\alpha_1$ for the metal of the first structure and $\alpha_2$ for the metal of the second structure). The materials of the first and second structures are chosen such that during transient operating conditions of the gas turbine engine the radial displacement of the double tenons is accomplished by the reaction of the first structure through the first hinges, this reaction having a value equal to the centrifugal reaction of the wheel and blades plus the thermal reaction of the turbine blades. After this initial reaction, a second, longer phase reaction takes place through the radial displacement of the double tenons by means of the reaction of the second structure. This has a value equal to the thermal reaction of the turbine wheel. It is to be understood that the term reaction is utilized to mean expansions when the engine is accelerating and contraction when the engine is decelerating. The device according to the instant invention, therefore, accommodate for both the transient and stabilized reactions of the turbine wheel and turbine blades.

The first structure may be located internally with respect to the second structure, although embodiments of the invention are presented where this relationship is reversed.

The displacement elements may have a generally "U" shaped cross section with attachment holes for the first and second hinges offset both peripherally and radially. In this arrangement, the displacement elements are hinged at four points; two points to the first structure and the remaining points of the second structure. Under certain conditions, unfavorable accumulation of manufacturing tolerances may result in a lack of parallelism between the first and second hinge axes thereby result-in the risk of jamming and other operational problems. To obviate these disadvantages, an alternative embodiment wherein the displacement elements are "T" shaped is presented.

The invention also encompasses the distribution of the air taken from a stage of the engine compressor via external piping, which may include control valves, in addition to taking the air from a downstream space exterior to the gas turbine engine's combustion chamber. Means are presented for allowing the ventilating air, after being directed against the shroud structure, to exhaust into the gas stream either downstream from the seal sectors or through orifices in the seal sectors.

The first or second structure, whichever has the higher thermal inertia may also contain thermal insulation located internally and/or externally.

In accordance with a characteristic of the invention, the ventilation air is taken off one of the final compressor stages and is introduced between the external structure and the internal structure through a number of circumferentially spaced spools. This provides for a rapid and homogeneous reheating or recooling, during acceleration or deceleration, around the periphery of the internal structure and at the same time a slow and homogeneous reheating and recooling around the periphery of the external structure.

The flow of air taken off the compressor stage noted above during a maneuver of the gas turbine engine is determined such that if $T_o$ is the temperature of the gases taken off at the beginning of the maneuver and $T_o+\Delta T$ is the temperature of the gases at the end of the maneuver, the temperature of the internal structure is between $T_o+0.95$ T and $T_o+\Delta T$ at the end of a period corresponding approximately to the response time of the gas tubine engine for the maneuver and the arrival time of the external structure at a stabilized temperature is equal to the arrival time for the turbine wheel temperature to be stabilized resulting from the maneuver. These factors may be influenced by the type of ventilations collected and the presence or absence of heat exchange accelerators on the internal structure and/or heat exchange decelerators (insulators) on the external structure.

In one embodiment of the invention, the structure having the higher thermal inertia is comprised of a part of the turbine casing itself.

The invention also relates to a method of determining the characteristics of a gas turbine engine rotor blade sealing device wherein the peripheral location of the double tenons is determined first and the coefficients of thermal expansion $\alpha_1$ for the first structure and $\alpha_2$ for the second structure are then selected so as to maintain the clearances at the blade tips.

Alternatively, the method may include first selecting the coefficients of expansion for the first and second structures respectively, and then locating the peripheral positions of the double tenons on the displacement element in order to maintain the proper clearances even during transient maneuvers of the gas turbine engine.

In accordance with an alternative method, the coefficients of thermal expansion $\alpha_1$ and $\alpha_2$ for the first and second structures, respectively, are selected to be approximately equal and the adjustment of the response times between the first and second structures is achieved by applying heat insulation material to the second structure and heat exchange accelerators (i.e. heating fins or the like) on the first structure as well as selecting the respective thicknesses of the first and second structures.

One of the advantages of using the instant invention is that minimal ventilating air is necessary to achieve its objectives, thereby maintaining the overall efficiency of the gas turbine engine.

The invention also does away with the need for a sophisticated air distribution system in which the flow and temperature are regulated by computer. A system according to this invention is particularly reliable since its operation depends only upon the geometric dimensions, coefficients of thermal expansion, and heat exchange coefficients, all of which are relatively fixed geometric or physical magnitudes, and not on movements controlled by a distribution valve which may be subject to friction or jamming. The only valve used with one of the embodiments of the instant invention is a simple on-off valve having minimal probability of failure.

BRIEF DESCRIPTION OF THE DRAWINGS

Other characteristics and advantages of the invention will be understood by reading the attached description in conjunction with the drawings in which:

FIG. 4 is a cross-sectional view taken along lines IV—IV in FIG. 3;

FIGS. 5 and 6 are sectional views taken along lines V—V and VI—VI, respectively, in FIG. 4;

FIG. 7 is an end view of the rotor blade sealing device according to the invention taken in the direction of arrow F in FIG. 3;

FIG. 8 is a partial perspective view of the first embodiment of a rotor blade sealing device according to the invention;

FIG. 9 is a partial sectional view corresponding to FIG. 4 showing an alternative method of attaching the external ring to the casing;

DETAILED DESCRIPTION OF THE PREFERRED EMBODIMENTS

Figure 1:
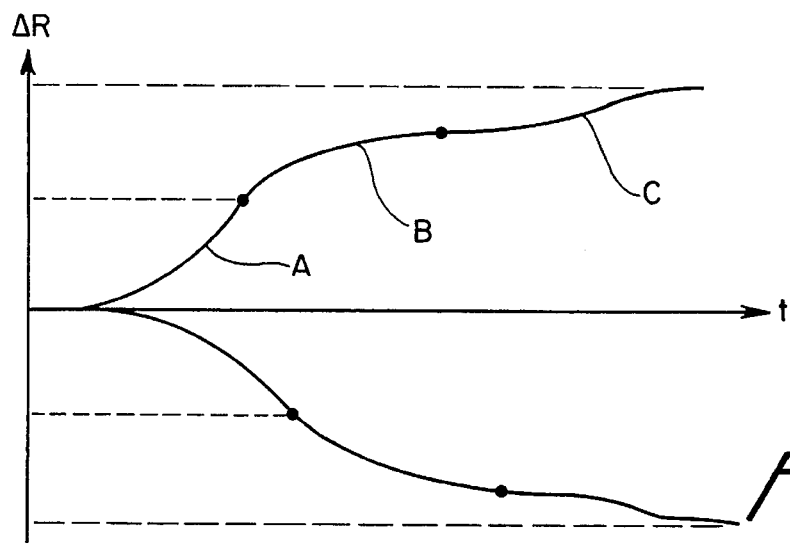
FIG. 1 is a graph showing the variation in the radius of the turbine blade tip under acceleration and deceleration in logrithmic coordinates versus time.

FIG. 1 shows a characteristic curve of the radial displacements of a blade tip as a function of time during acceleration (above the time axis) and deceleration (below the time axis). The line above the time axis t represents variations (ΔR) as a function of time in the radius of a blade tip for the acceleration from the idling speed mode to the full throttle mode of a gas turbine engine, the variations beginning with the stabilized idling mode. The curve below the time axis t, represents the variation ΔR (negative) of the radius of the blade tip for deceleration from the full throttle mode to the idling speed mode of the gas turbine engine, beginning with the stabilized full throttle mode.

Figure 2:
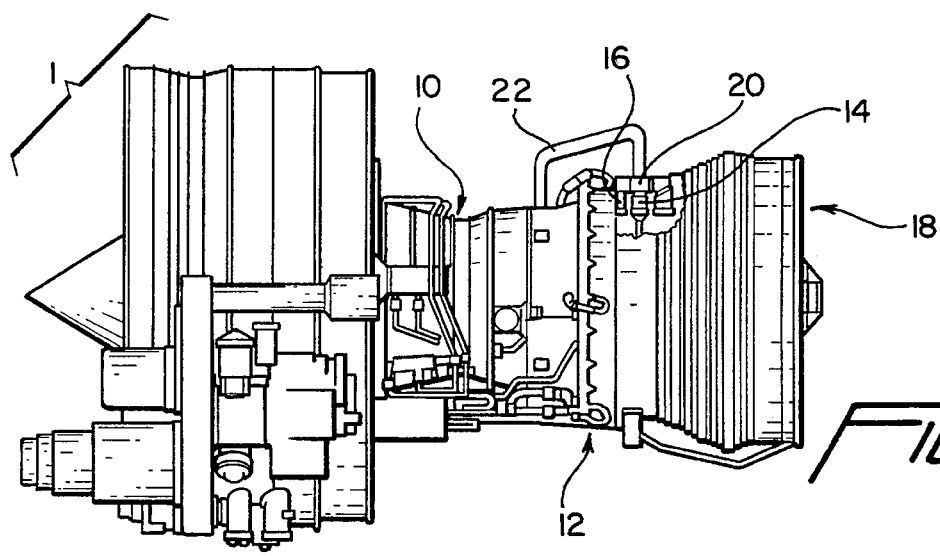
FIG. 2 is a side view partially broken away, of a gas turbine engine incorporating a device according to the first, second and fifth embodiments of the invention.
Figure 3:
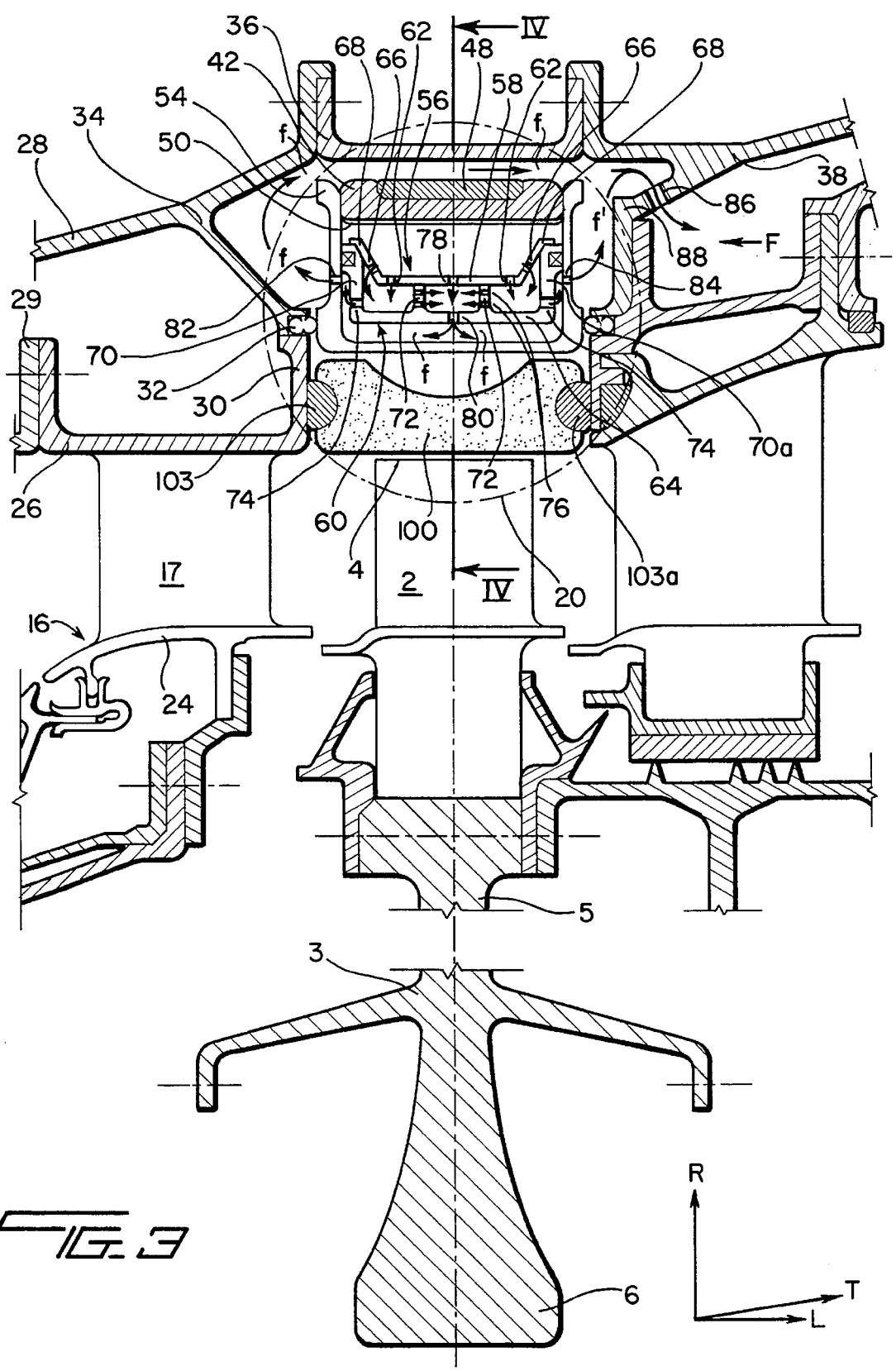
FIG. 3 is a partial side sectional view showing the rotor blade sealing device according to a first embodiment of the invention.

A typical example of a gas turbine engine is shown in FIG. 2 and the operation described hereinafter is with reference to tips 4 of blades 2 mounted on turbine wheel 3 as shown in FIG. 3.

As can be seen in FIG. 1, the variation of the radius of tip 4 of turbine blades 2 as a function of time follows a rather complex law, the principle of which is described below for an acceleration beginning in the stabilized idling speed mode and continuing until the complete stabilization of temperature in the gas turgine engine's full throttle mode.

During the first phase, A, which is of a duration on the order of seven seconds, for example, the preponderant effect is the expansion of wheel 3 and blade 2 due to the centrifugal forces acting on them, and the thermal expansion of blade 2. During this phase the effect of thermal expansion of rim 5 of wheel 3 and center portion 6 of wheel 3 is of a secondary nature.

During the second phase, B, which may last for several minutes, the thermal expansion of rim 5 and the thermal expansion of center part 6 of wheel 3 takes place, with the residual thermal expansion of blade 2 becoming negligible.

During the third phase, C, which may also last for several minutes, the thermal expansion of central part 6 of the wheel 3 becomes predominant, the rate of thermal expansion of rim 5 decreases and the thermal expansion of blade 2 is practically terminated.

A similar analogy can be also made for the lower portion of the curve shown in FIG. 1 corresponding to the deceleration from the stabilized full throttle mode to the stabilized idling speed mode for the gas turbine engine.

FIG. 2 shows a side view of gas turbine engine 1 comprising at least a compressor stage 10, a combustion stage 12, at least one turbine 14 with a distributor 16, and an exhaust nozzle 18. The turbine is fitted with a sealing device 20 conforming to the first embodiment of the invention. This device is supplied at all times by air from at least one stage of the compressor section 10 (taken off the downstream side of the compressor, for example) through pipe 22.

As shown in FIG. 3, the turbine assembly comprises a distributor 16 having vanes 17 secured in known fashion to interior shroud 24 and exterior shroud 26 which is attached to terminal portion 29 of the external shell of the combustion chamber (not shown) by known means. Exterior shroud 26 is centered in casing 28 by the engagement of radial flange 20 with conical flange 34 integral with casing 28. An ω-shaped seal 32 is interposed at the juncture of flange 30 with conical flange 34 to prevent leakage of gases through this joint. Seal 32 also bears against a U-shaped displacement element 54 to prevent leakage of gases therebetween, as will be hereinafter described in more detail.

Casing shroud 36 surrounds the sealing device 20 and is fixed to casing 28 and casing 38 via bolts (not shown) extending through holes in its radial flanges. Casing shroud 36 has sufficient strength and inertia in cooperation with its attachment to upstream casing 28 and downstream casing 38 such that it retains its circular shape and will not be deformed into an oval shape. Casing 36 may have certain heterogeneities in its structure which may modify its mechanical or thermal inertia at certain points about its circumference. These points may be determined by known testing techniques and reinforcements attached to the casing shroud in order to reduce any tendency it may have to assume an oval shape. Casing shroud 36 is also coaxially aligned with the rotational axis of the turbine engine.

Referring to FIGS. 3 and 4, it is seen that casing shroud 36 has recesses 40 defined by longitudinal channels that serve to position external ring 42 within casing shroud 36. Casing shroud 36 also includes at least one air inlet 22 (see also FIG. 2). Preferably, a number of air inlets 22 are distributed about the circumference of casing shroud 36 to allow an even distribution of air into the annular space between outer ring 42 and ring 56. The air enters through spools 44 and the distribution of the air inlets about the periphery insures an evenly distributed quantity of air to insure a very short response time of ring 56.

External ring 42 has a monolithic structure and may be coated with layers 48 and 50 of thermal insulating materials on its external and interior surfaces, respectively, to slow down the heat exchange between ring 42 and the incoming air and the air circulating between external ring 42 and ring 56. The layers of heat insulating material may be of any known composition, such as a magnesium zirconate base to which zirconate of other metals has been added.

External ring 42 has regularly spaced longitudinal studs 52 (also shown in FIG. 8) that cooperate with recesses 40 to properly locate external ring 42 within casing shroud 36. Longitudinal studs 52 are dimensioned so as to leave a radial clearance between their exterior surface and the interior surface of the recess 40 so as to permit the thermal expansion of external ring 42 within casing shroud 36. The inertias of upstream casing 28, downstream casing 38 and casing shroud 36 as well as that of external ring 42 insure that ring 42 remains concentric with the rotational axis of the turbine wheel. Moreover, since external ring 42 is primarily acted upon by balanced forces in the peripheral direction, it retains its circular section.

The thermal response time of external ring 42 is of substantial magnitude, for example on the order of ten minutes, because of its substantial thermal inertia and because of the presence of thermal insulation layers 48 and 50.

Internal composite ring 56, having a very short response time, is located within external ring 42 and secured to it isostatically by U-shaped displacement elements 54. Composite ring 56 comprises monolithic internal ring 60 having radial end walls 70 and 70A, and which also may be provided with radial internal baffles 72 to increase the cross-sectional rigidity to avoid any deformation from its circular shape, and outer cover ring 58. The external forces acting on this ring are balanced about its periphery, therefore there is no deformation of this ring due to mechanical forces whether the engine is operating in a transient mode or a stabilized mode.

It should be noted that it is not absolutely necessary that casing shroud 36, external ring 42, composite ring 56 and internal ring 60 have a perfect circular section during all phases of the gas turbine operation. It is sufficient that analogous points rest on a circle whose center is coincident with the rotational axis of the engine and that such points be peripherally distributed.

Outer cover ring 58 can be formed from individual sectors or as a single piece. In either case, it is in contact with air supplied through ducts 22 and directed into the space between outer cover ring and external ring 42. This distribution of air is shown by the arrows in FIG. 4. Outer cover ring 58 can be attached to internal ring 70 by any known means, such as defusion brazing. Cover ring 58 has a large number of holes for impact cooling, in known fashion, the various members of internal ring 60.

Air circulation in and about composite ring 56 takes place as follows: air flowing from compressor 10 through ducts 22 enters the annular space between external ring 42 and outer cover ring 58 via spools 44; the air then penetrates to the interior of composite ring 56 through radial holes 62 (see FIG. 3) which are numerous and regularly distributed through outer cover ring 58, and impact cools the external surface 64 of internal ring 60; and walls 70 and 70A of composite ring 56 are cooled via air passing through holes 66 in the slanted wall section 68 of cover ring 58. The air that has penetrated the annular upstream and downstream chambers of composite ring 56, the chambers delimited by upper surface 64 of internal ring 60, upstream and downstream radial end baffles 70 and 70A, outer cover ring 56 and by internal baffles 72, exhausts between composite ring 56 and the U-shaped displacement elements 54 through holes 74 regular spaced around end baffles 70 and 70A, and through holes 76 in radial baffles 72. The air passing through radial baffles 72 passes into the middle annular chamber of composite ring 56 where this air can be mixed with air flowing through outer cover ring 58 via holes 78. The air within this middle chamber exits through holes 80 in internal ring 60. This air then circulates, a portion upstream and a portion downstream, inside the U-shaped elements 54 along wall 64 until it mixes with air passing through holes 74 through radial end flanges 70 and 70A.

It can be seen that all of the external and internal walls of the composite ring 56 are covered by the air from the compressor stage and are very quickly brought to the temperature corresponding to that existing in the compressor stage from which the air was taken. Additionally, other known means can be provided to facilitate and speed up the heat transfer process. For example, radial flanges 70 and 70A and the internal wall 64 can be formed with hat exchange accelerator members such as wedges or fins. Similar elements can be provided on baffles 72.

The ventilation air having circulated inside and outside composite ring 56 through holes 74 and 80 thus follows the internal and lateral walls of ring 56 and then flows along the following path: upstream the air flows through holes 82 in the upstream wall of displacement element 54, flows along this wall, and then turns downstream on the outside of external ring 42 following arrows f in FIG. 3; downstream, after having followed the downstream external wall 70A the air flows through holes 84 through the downstream wall of displacement element 54 along the path of arrows f' where it is reunited with the air circulating from the upstream section. The air is then exhausted in known fashion through holes 86 in wall 88, integral with downstream casing 38.

The foregoing embodiment is one in which the external ring 42 provides a long response time, while composite inner ring 56 provides a short response time, typically on the order of seven seconds. Since the incoming air is evenly distributed through the plurality of ducts 22 and spools 44, the temperature of rings 42 and 56 remains peripherally homogeneous even during transient operating conditions. This excludes any possibility of thermal distortion of the rings.

Referring to FIGS. 4 and 6, it can be seen that external ring 42 defines longitudinal bore holes 90 passing through it adjacent to locating studs 52. Similarly, as seen in FIGS. 4 and 5, composite inner ring 56 defines bore holes 92. U-shaped displacement elements 54 are hingedly attached to the external ring 42 by pin 94 which passes through bore hole 90. The displacement elements 54 are also hingedly attached to composite ring 56 by pin 96 passing through bore holes 92.

Displacement elements 54 have double tenons 98 extending radially inwardly from its lower portion to engage correspondingly shaped grooves 102 in sealing sectors 100. Sealing sectors 100 define the sealing shroud for the turbine blade tips 4. The diameter of the circle defined by the interior surface of the sealing sectors is variable according to the engine operating conditions in order to maintain a very small positive clearance between it and the blade tips 4, as will be explained in more detail hereinafter.

The sealing sectors 100 have a minimum clearance with respect to adjacent sectors when they are in their radially innermost position, such clearance increasing as they are displaced radially outwardly. The relative displacement of the sectors 100 is facilitated by forming the depth of the peripheral grooves 102 greater than the width of the double tenon 98. Means are provided to prevent any leaks that may occur between the sectors and the double tenons and to prevent any direct impingement of hot gases from the interior of the turbine onto displacement elements 54.

Double tenons 98 also should have a rounded shape with the roots of a lessor dimension to allow for the slight rotation in either direction that each sector makes during their radial movement.

The general arrangement of the invention is shown in FIG. 8 wherein the surrounding structure has been removed to facilitate its understanding. It can be seen, although the sealing ring is formed from a plurality of sectors 100, it retains its circular configuration and the concentricity with respect to the axis of the engine throughout all operating conditions whether transient or stabilized as if it were a monolithic structure. As noted above, casing shroud 36 is relatively undeformable, while external ring 42 has sufficient inertia such that it is also relatively undeformable. The expansions or contractions to which this ring will be subjected due to exposure to the heated air taken from the compressor will not alter its circular shape nor its concentricity with the axis of the gas turbine, but will only displace hinge pins 94 in a radial direction.

Composite ring 56, having the short response time, also has sufficient inertia to retain its circular configuration. The expansion and contractions to which it will be subjected by exposure to the ventilating air will not alter its circular shape nor its concentricity, but will displace hinge pin 96 in a radial direction.

Since composite ring 56 has a noticeably shorter response time than external ring 42, initial exposure to the higher temperature ventilating air will cause the expansion of composite ring 56 and the consequent movement of hinge pin 96 radially outwardly. This, in turn, will cause each displacement element 54 to rotate slightly about hinge pin 94 which, during this initial time period, remains relatively fixed. Expansion of displacement element 54 also takes place, but this is the same for all the displacement elements since all are equally exposed to the ventilating air and all have the same thermal properties.

The pivotal movement of displacement elements 54 about hinge pin 94 due to the radial displacement of hinge pin 96 quite obviously causes radial displacement of the sealing sectors 100 due to their connection via groove 102 and double tenon 98. After the short term response of composite ring 56, the position of hinge pins 96 is relatively fixed and the long response time, external ring 42 begins to expand and move hinge pins 94 radially outwardly. This causes a rotational movement of displacement element 54 about hinge pin 96 and additional radially outward movement of sealing sectors 100. It should be understood that exposure to relatively cooler ventilating air will cause contraction of the various elements in substantially the same fashion.

The displacement of each hinge point will be the same as a function of time whether the engine is operating under fast or slow transient conditions, or a stabilized mode, for each system associated with reach recess 40 for each of the reference directions shown in FIGS. 3 and 4 (radial axis R, tangential axis T, and longitudinal axis L). With respect to the reference systems for each recess 40, the corresponding displacement elements 54 will have exactly the same positions, the distance to the axis of the gas turbine engine from each double tenon 98 will be the same, and the angle between the two adjacent tenons will be exactly $2\pi/n$ if n is the number of tenons. Each sealing sector 100 thus will have the same relative position vis a vis the axis and the same clearance from the blade tips.

The clearance at the center of each sector will be very slightly increased with respect to the clearance at its two extremities. This slight difference in clearance depends upon the scope of the expansions as well as on the angle of the sectors and also on their number. This difference may be on the order of 0.05 millemeters and an be compensated for in the cold condition, by selecting the curvature of the sectors as described hereinafter.

Each of the sealing sectors 100 is displaced by tenons 98 by translation in the radial direction. These sectors are at rest on a circle with mean radius $R_{vo}$, and when hot on a circle with means radius $R_{vi}$. They have radius of curvature $R_{vco}$ cold and $R_{vci}$ in operation. This radius of curvature varies as a function of mechanical and thermal constraints associated with each sector. If there is a deviation between $R_{vi}$ and $R_{vci}$, the radial clearance between the rotor and the stator will vary—slightly—between the middle and the end of each sector. It is possible to obtain radial clearance between the sectors and the apex of the rotor blades that is perfectly uniform for a selected operating point (j) by proceeding as follows: for this operating condition the sectors are on a circle with radius $R_{vj}$, each having radius of curvature $R_{vcj}$, which can be equal to $R_{vj}$; between the state of rest and the j state, the mean radius of a sector varies by an amount $\Delta R_{vj} = R_{vj} - R_{vo}$, and the radius of curvature of the aforesaid sector varies by an amount $\Delta R_{vcj} = R_{vcj} - R_{vco}$.

Because the sectors form a perfect circle in the j state, it is sufficient to manufacture them individually with an initial radius of curvature $R_{vco}$ such that:

$$R_{vco} = R_{vo} + \Delta R_{vj} - \Delta R_{vcj}$$

One of the preponderant reasons for maintaining the concentricity of the sectors, and for preventing them from assuming an oval shape, is, in addition to the peripheral homogeneity of the support members, the fact that the relative positions of hinge pins 94 and 96 are peripherally different. If we consider the case of acceleration of the turbine from idling speed to full throttle, the expansion of composite ring 56 will cause displacement element 54 to rotate slightly in a clockwise direction about hinge pins 94, while at the same time, the expansion of displacement elements 54 will displace hinge pin 96 away from hinge pin 94. The net result will be an increase in the radius of the positions of hinge pins 96 (and correspondingly of tenons 98) and at the same time a slight rotation of composite ring 56 in the counterclockwise direction (as seen in FIG. 4) with respect to external ring 42 and casing shroud 36.

As external ring 42 increases in temperature, hinge pins 94 will be displaced radially outwardly by the pivoting action of displacement elements 54 in a counterclockwise direction about hinge pin 96. This causes an additional increase in the radial position of tenons 98 and, consequently, the positions of sealing sectors 100. Thus, as can be seen, there is no tendency of any part of the structure to take on an oval shape because of thermal heterogeneities in the system or any other reason.

In the foregoing discussions, tenons 98 have been located in the circumferential center of the displacement elements 54. This corresponds to the optimum position when the expansions satisfy the following equation:

$$(dcd_m - dcd_r) + (dca_m - dca_r) + (dta_m - dta_r) = (dtd_m - dtd_r)$$

This position may vary depending on the particular type of engine in which the system is utilized. When the difference between the maximum speed mode and the idling speed mode for the first term of the above equation (that is, the sum of the centrifugal differential expansions of the wheel and blade plus the thermal expansion of the blade with a short response time) is greater and the second term of the equation (the thermal expansion of the wheel with a long response time) tenons 98 can be positioned with respect to the displacement element 54 in accordance with the ratio of the expansion defined by the first term of the equation to the total expansion. The ratio of the angular distances between the axis of hinge pin 96 and tenon 98, and between tenon 98 and the axis of hinge pin 94 for each displacement 54 is in the ratio of the expansion (or contraction) for the short response time (the first term of the above equation) and the total expansion (or contraction) expressed as follows:

$$\frac{\text{1st term of the above equality}}{\text{1st term + 2nd term of the above equality}}$$

Another method of selecting the characteristics of the sealing device consists of initially selecting the materials from which external ring 42 and composite ring 46 is made, thus fixing the coefficients of thermal expansion $\alpha$. The adjustment of the radial displacement of the sealing sectors 100 with respect to the radial displacement of blade tips 4 can be adjusted by choosing the stage of the compressor from which the ventilating air is drawn (which determines the variation in the temperature of the parts between stabilized idling mode and full throttle modes); by incorporating heat insulating materials or heat exchange accelerators onto external rings 42 or composite ring 46, respectively; and by optimizing the positions of tenons 98 so as to minimize deviations between the radial displacement of the rotating structure and the stationary structures. The radial displacement of tenons 98 (and consequently sealing sectors 100) is, at each moment in time, the "barycentre" of the radial displacements of composite ring 56, having a short response time, and external ring 42, having a long response time with coefficients equal to the relative angular deviation (measured from the axis of the gas turbine engine) that separates tenon 98 from hinge pin 94 and 96. The radial displacement of tenons 98 thus follow the radial displacements of blade tips 4 as they expand and contract along the curves shown in FIG. 1.

As noted above, the expansion and contraction characteristics of the invention may be controlled by selecting one of the independent parameters, such as: coefficients of expansion ($\alpha$) for the materials; the stage of the compressor from which the ventilating air is taken off thereby controlling the temperature (T) of the ventilating air; the ratio of angular distances between tenons 98 and hinge pins 94 and 96; and the use of heat exchange accelerators or retarders. In one preferred method, the materials for the internal and external structure are selected as a first step (coefficients of thermal expansion being $\alpha_i$ and $\alpha_e$ which may also be equal) as is the compressor stage from which the ventilating air is withdrawn (thus selecting the deviation $\Delta T$ in the temperature between the stabilized idling and stabilized full throttle modes). The second step is to determine the position of double tenons 98 on the displacement elements 54. The third step is to determine the usage of heat exchange accelerators on the external structure and heat exchange retarders on the external structure and, consequently, the response times of these two structures in order to obtain a radial displacement of the sealing sector 100 that matches the displacement of the blade tips 4 as a function of time during a maneuver of the gas turbine engine.

The following illustration for selecting the materials for the external rings 42 and composite ring 56 is presented in which:

the coefficient of thermal expansion of a turbine wheel of radius $r_d$ between idling speed and full throttle is $\alpha_d$, and the corresponding temperature difference for the wheel metal is $\Delta T_D$; the coefficient of thermal expansion of a blade of length l is $\alpha_a$ and the corresponding temperature difference for the blade metal is $\Delta T_a$; the coefficient of thermal expansion for external ring 42 of radius $r_e$ is $\alpha_e$ (to be determined) and the coefficient of thermal expansion for composite ring 56 of radius $r_i$ is $\alpha_i$ (to be determined), and the difference in temperature between idling speed and full throttle of the air brought by spools 44 is $\Delta T_c$ (valid stabilized for the solution now described, for external ring 42 as well as for composite ring 56); and, finally the centrifugal differential expansion of the wheel and of the blade is $\Delta R$. It can be assumed for this typical case that $\Delta R + \alpha_a \cdot \Delta T_a \cdot l = \frac{1}{2}(\Delta R + \alpha_a \Delta T_a \cdot l + \alpha_d \cdot \Delta T_d \cdot r_d)$ that is, that $\Delta T_d \cdot r_d = \Delta R + \alpha_a \cdot \Delta T_a \cdot l$ This means that the double tenons 98 will have been placed on the bisector of an angle the apex of which is located on the axis of the gas turbine engine, and the sides of which pass through the axes of hinge pins 94 and 96, respectively.

Thus, for the determination of the metal to use for composite ring 56, and more precisely, for the determination of its coefficient of expansion (the expansion of the displacement elements 54, having no bearing on the radius of composite ring 56, but only on its differential rotation with respect to external ring 42 and casing shroud 36), we have:

$$\frac{1}{2} \alpha_i \cdot \Delta T_c \cdot r_i = \Delta R + \alpha_a \cdot \Delta T_a \cdot l$$

from whence:

$$\alpha_i = \frac{2(\Delta R + \alpha_a \cdot \Delta T_a \cdot l)}{\Delta T_c \cdot r_i}$$

and equally for $\alpha_e$, we have:

$$\frac{1}{2} \alpha_e \cdot \Delta T_c \cdot r_e = \alpha_d \cdot \Delta T_d \cdot r_d$$

from whence:

$$\alpha_e = \frac{2\alpha_d \cdot \Delta T_d \cdot r_d}{\Delta T_c \cdot r_c}$$

FIG. 9 shows an alternative embodiment of the attachment means for attaching external ring 42 to casing shroud 36. In this embodiment, casing shroud 36 has a plurality of radial bores 53 appropriately flanged to maintain the inertia of external ring 42 and to secure the guide pins 51. External ring 42 also has a plurality of radial bore holes 53a of the same diameter as holes 53 and also appropriately flanged for the same reasons. Guide pins 51 are inserted through the correspondingly located holes in order to secure external ring 42 to the casing shroud 36. In this particular case, the bores 90 are circumferentially offset with respect to the guide pins 52. Pins 51 may be held in position by any known means.

The peripheral clearance between adjacent sealing sectors 100 is at a minimum under cold conditions, increases when the engine is running, and is at a maximum when the engine achieves its stabilized full throttle mode. Although the clearance between sectors can be on the order of a millemeter, it is necessary to prevent leakage between the sectors. Any such leakage will directly contact displacement element 54 thereby forming localized high temperature areas which may cause undesired thermal deformation of the assembly into an oval shape. In order to minimize these detrimental leaks between the sealing sectors, at the upstream and downstream stationary structure, seals 103 and 103a (see FIG. 3) are incorporated into the upstream and downstream edges of sealing sectors 100. These seals can be annular shaped flexible metallic segmented seals and are inserted into grooves 104 and 104a formed in the sealing sectors 100.

Figure 10:
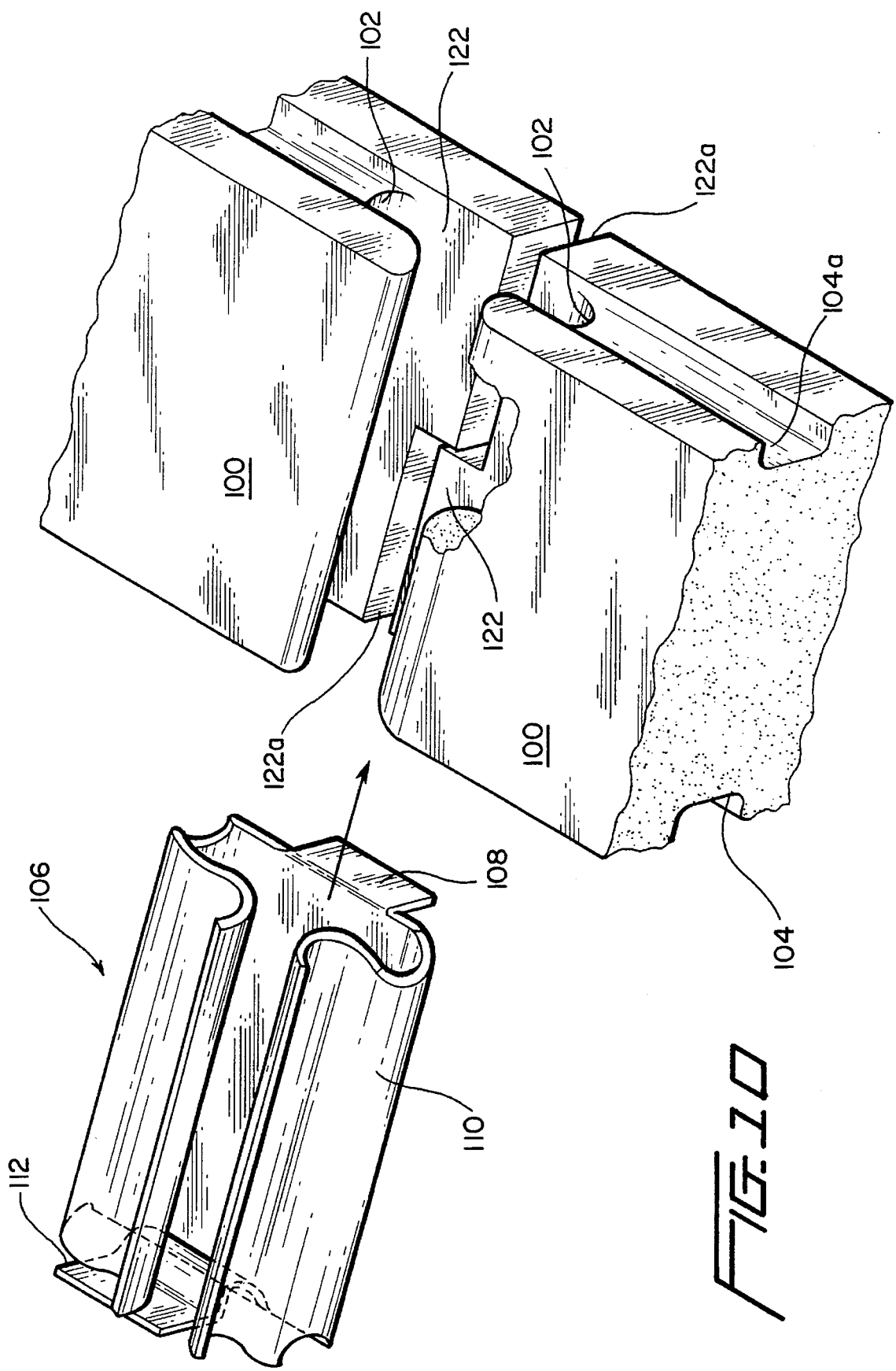
FIG. 10 is an exploded, perspective partial view showing the sealing sectors with the device for improving tightness between adjacent sectors and in the radial direction according to the invention.

As shown in FIG. 10, sealing sectors 100 may have crenelated surface 122 having a larger peripheral dimension at the maximum clearance between adjacent sealing sectors 100 and recessed portion 122a.

The sealing sectors 100 are symmetrical and are installed on displacement elements 54 by first sliding every other sector 100 onto its respective tenons such that notched section 122a faces toward the downstream side of the gas turbine and subsequently inserting sectors between those such that their recessed section 122a faces toward the upstream side of the gas turbine engine. As seen in FIG. 10, the recessed portions 122a will mutually engage those of the adjacent sealing sector. It will be seen that the supports for the crenelations of the first clearance on the supports for the crenelations of the second clearance insure the longitudinal seal even when the peripheral distances between adjacent sectors are at their maximum.

Prior to inserting sectors 100 onto double tenons 98, intermediate metal seals 106 are put into place. One of the two lugs 112 is folded inward to insure the radial seal between two adjacent sectors. The assembly is slid into place between adjacent sectors after which the other lug 108 is folded inwardly. The envelope shape 110 around double tenons 98 ensures the radial seal between two adjacent sectors. The seal is due to the flexibility of seals 106 in addition to any difference of pressure between the air exterior to sectors 100 and the gaseous stream inside sectors 100 which serves to increase the sealing effect.

Figure 11:
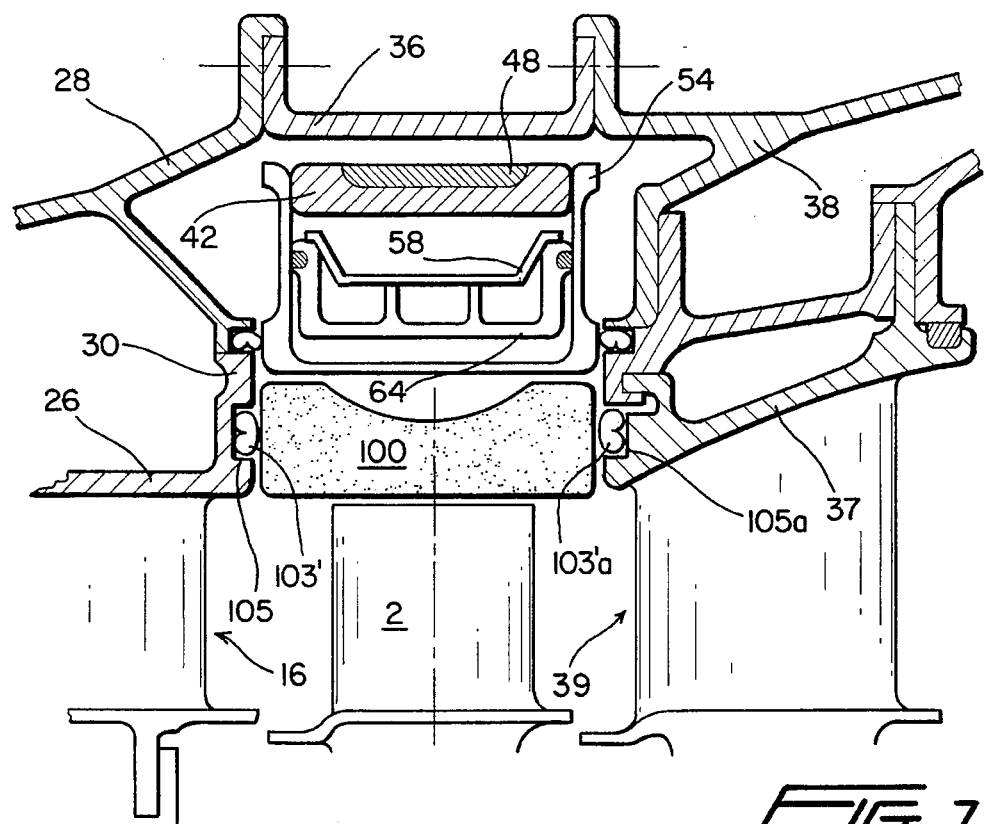
FIG. 11 is a partial side sectional view corresponding to FIG. 3 showing alternative sealing means between the sealing sectors and the engine casing according to the invention.

Since sectors 100 are radially displaced, seals 103 and 103a must be segmented to accommodate this radial movement. This causes the possibility of leaks occurring between the seal segments and about the periphery. This possibility can be obviated, as shown in FIG. 11, by eliminating grooves 104 and 104a in the sealing sectors and installing omega-shaped seals 103' and 103a' in grooves 105 and 105a located in the stationary casing structure. The seals may be annular in shape since they do not have to undergo any radial expansion and contraction and serve to prevent local radial leaks in both the upstream and downstream direction.

The response time for the centrifugal expansion of turbine wheel 3 and blades 2, and the thermal expansion of blades 2, wheel 3, rim 5 and center portion 6 are quite characteristic of a specific engine. It is possible that the first of the response times (designated $t_r$, with r indicating rapid) is particularly short. It may also occur that the thermal expansion time for the turbine wheel is particularly long (designated $t_l$, with l indicating slow). Under these circumstances, the flow of ventilating air from the compressor would have to be increased to adjust the response time of composite ring 56 to conform to $t_r$. However, this would decrease the efficiency of the gas turbine engine and would also increase the heat exchange between the air and the external ring 42, necessitating an increase in the heat insulating material to prevent a reduction in its response time.

Figure 12:
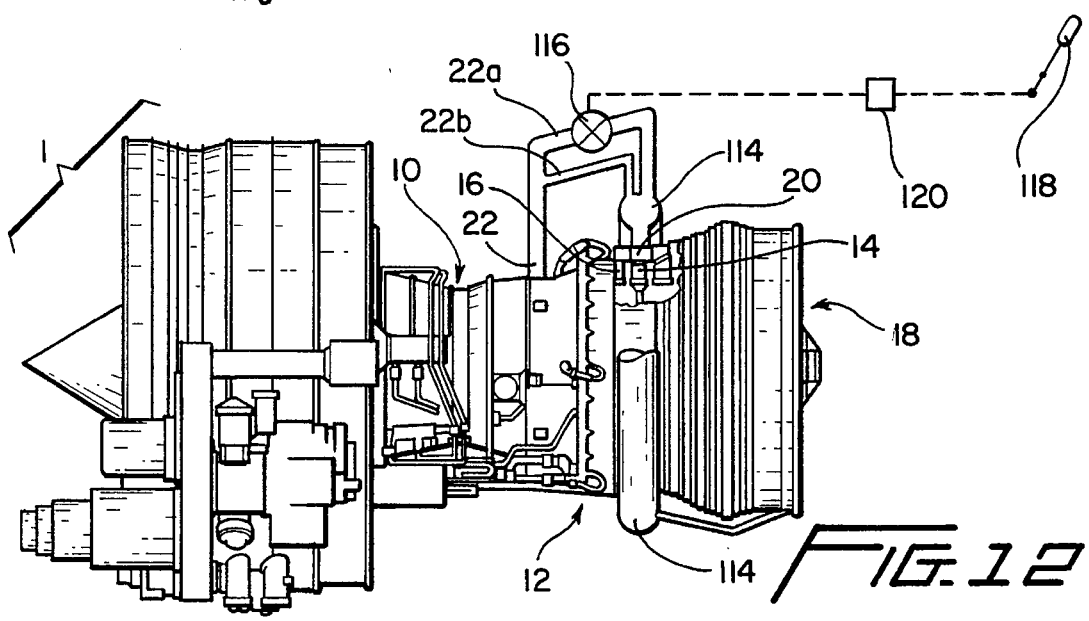
FIG. 12 is a side view, partially broken away, showing an alternative means for supplying air to the sealing device according to the invention.

This problem is resolved by the embodiment of the invention shown in FIG. 12, this embodiment also being sued to generally reduce the amount of ventilating air required. In this embodiment, the piping 22 of FIG. 2 has been split into one or more large flow pipes 22a and into one small flow pipe 22b. All of these pipes discharge into manifold 114 which surround the clearance device 20. Pipe 22a has open or closed valve 116 controlled by control means 118 which may be the throttle for the gas turbine engine. Valve 116 is open when the throttle is open and remains open for a time $t_r$ (or slightly longer if necessary) and then is closed by timer 120. This enables the shortening of the response time of composite ring 56 by limiting the large flow of ventilating air to short periods of time, while at the same time increasing the response time of external ring 42 without increasing its thickness or adding thermal insulating material since the ventilating air flow provided by pipe 22b is very small, thereby slowing the heat exchange to external ring 42.

Manifold 114 is connected to ducts 22 shown in FIG. 4 by sufficient connection so as to effect the homogeneous distribution of air from the compressor between external ring 42 and composite ring 56 when both pipes 22a and 22b are open and only when small pipe 22b is open.

The probability of failure of valve 116 is relatively small since this valve is one which is either fully open or fully closed and is, therefore, quite simple in construction. Its operation can be further indicated by an audible or visual signal actuated in the cockpit upon any valve malfunction. Thus, in order to avoid any damage to the engine, the pilot can revert to idling speed and then once again progressively accelerate in order to avoid any wear of the sealing sectors 100.

Figure 13:
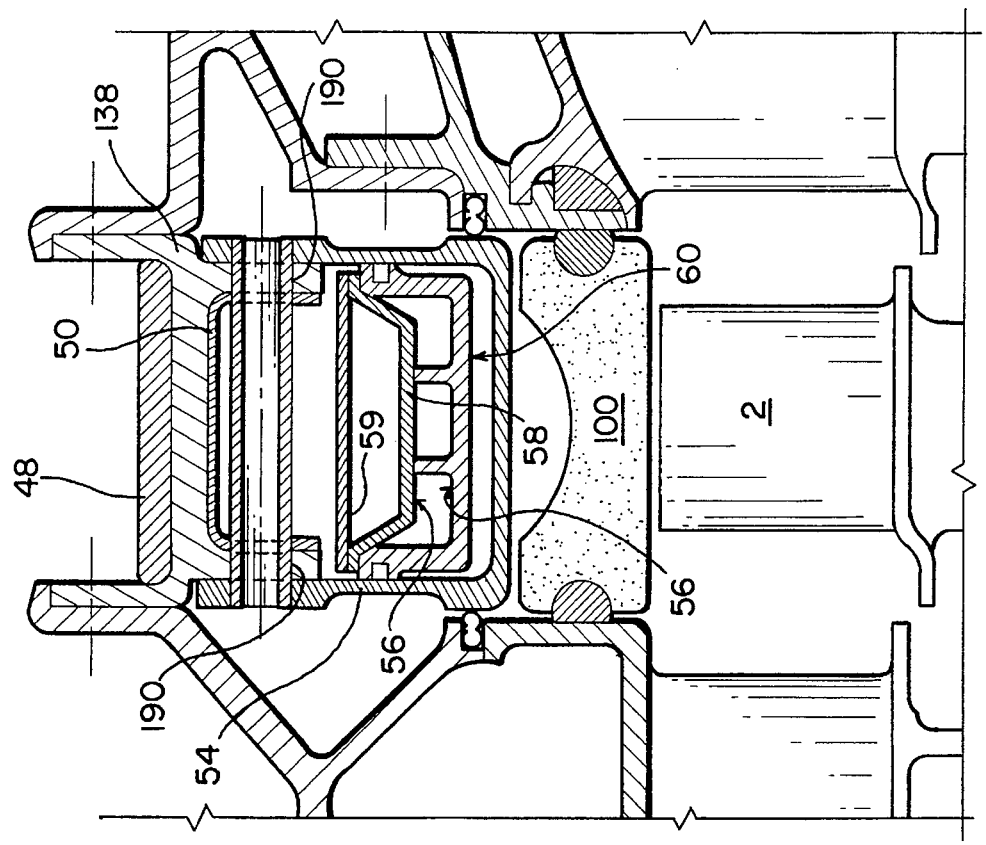
FIGS. 13 and 14 are partial sectional views corresponding to FIG. 3 showing a second embodiment of the sealing device according to the invention.
Figure 14:
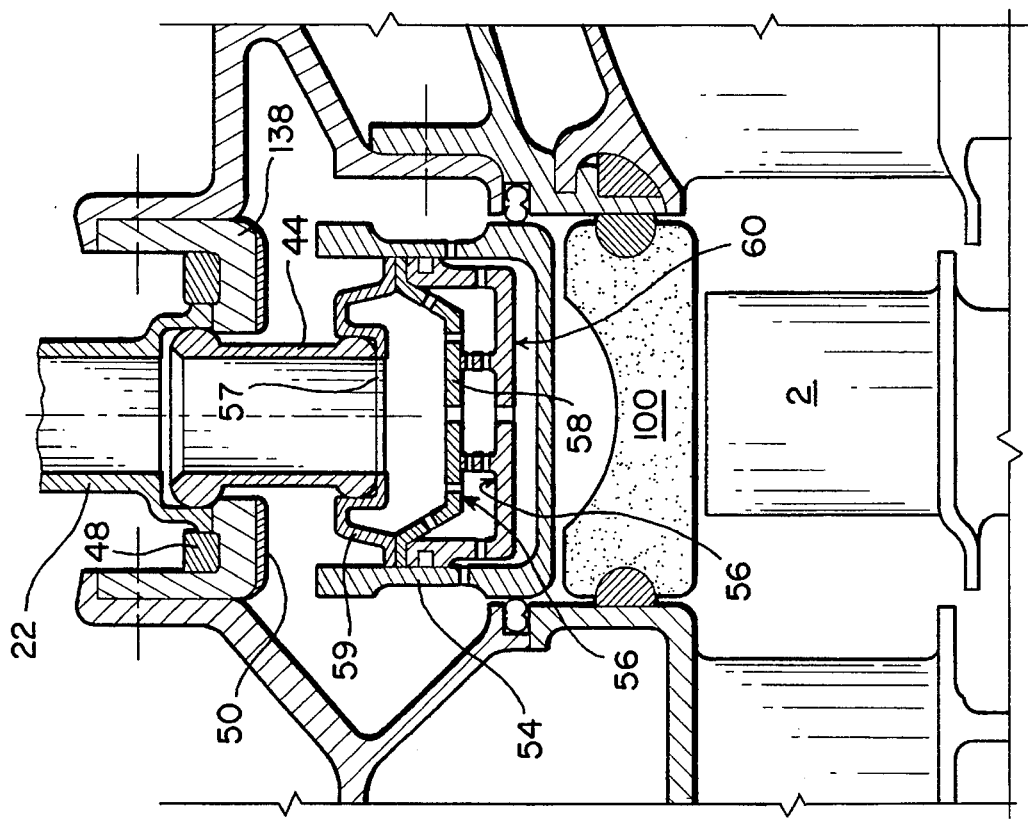

FIGS. 13 and 14 are analogous to FIGS. 5 and 6, but show a second embodiment according to the invention. As in the first embodiment, the long response time ring is mounted exteriorly to the short response time ring.

This embodiment differs from the first embodiment insofar as external ring 42 and casing shroud 36 are formed integrally with each other. This casing ring 138 is attached to radial flanges of upstream casing 28 and downstream casing 38 as was casing shroud 36 in the first embodiment. Casing 138 may have heat insulating material 48 and 50 attached to its exterior and interior surfaces, respectively. Heat insulating material 50 may be a ceramic lining hiving high insulating capacity. Air inlet ducts 22 direct air through spools 44 which, as in the first embodiment, are regularly distributed about the periphery of the device, directly into the interior of composite ring 56 through passages 57 in cover ring 59. Depending flanges of casing 138 are regularly spaced about its interior periphery and serve to define bores 190 through which hinges pins 94 are inserted to attach displacement elements 54 thereto as in the first embodiment.

Composite ring 56 has cover 58 as in the first embodiment in addition to exterior cover ring 59 to define an annular air space into which the ventilating air is directed. All of the ventilating air is thus used in a controlled fashion. This eliminates the possibility of leaks between adjacent displacement element 54 which may result in temperature heterogeneities and consequent ovalness of the structure. The operation of the second embodiment is substantially similar to that of the first and no additional detailed description is believed to be necessary.

The exterior stream of gas around the high pressure turbine is quite often cylindrical, but it may be conical, diverging generally in the downstream direction. The present invention may be utilized with such divergent turbine structures with minor modifications. Stems 124 (see FIG. 4) connecting the double tenons 98 to the displacement element 54 may be taped in height from upstream to the downstream direction to orient the sealing sectors such that they define a circle of increasing diameter from the upstream to the downstream ends. Additionally, steams 124 can be maintained at a constant height, but sealing sectors 100 may be formed with decreasing thickness towards the downstream direction.

Figure 15:
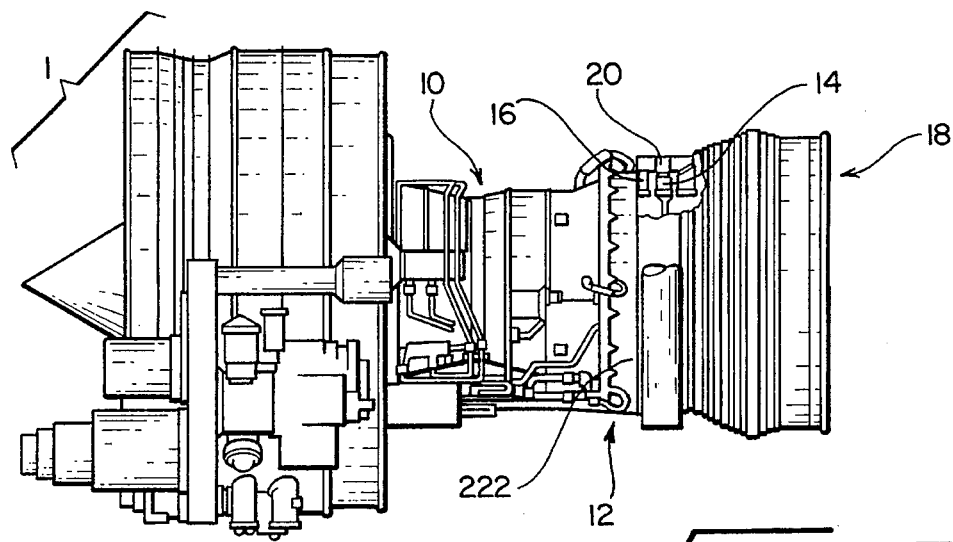
FIG. 15 is a side view, partially broken away, of a gas turbine engine in accordance with third and fourth embodiments of the invention.

FIG. 15 shows a gas turbine engine 1, similar to that shown in FIG. 2, having at least a compressor stage 10, a combustion system 12, at least one turbine 14 with a distributor 16, and an exhaust nozzle 18. The turbine is fitted with a sealing device 20 according to the invention which is provided with air at all times from an exterior space downstream from combustion chamber 222. This air is at a higher pressure than that found upstream from turbine 14 because of the static pressure drop in distributor 16.

Figure 16:
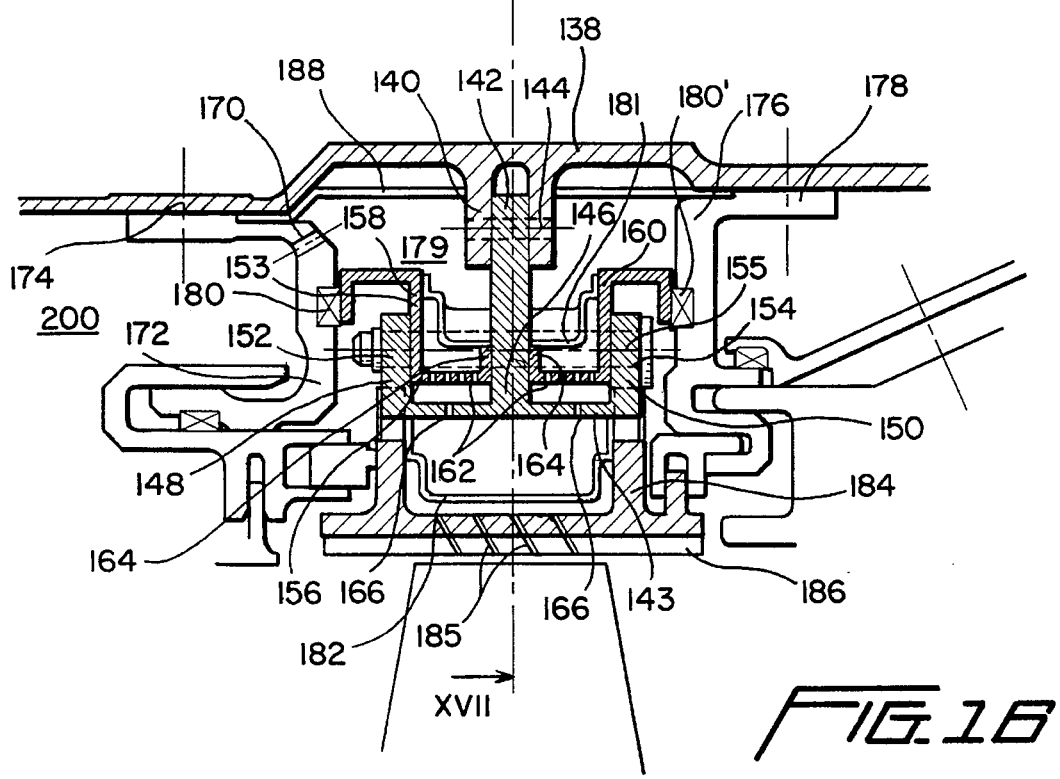
FIG. 16 is a side, sectional view corresponding to FIG. 3 showing a third embodiment of a sealing device according to the invention.
Figure 17:
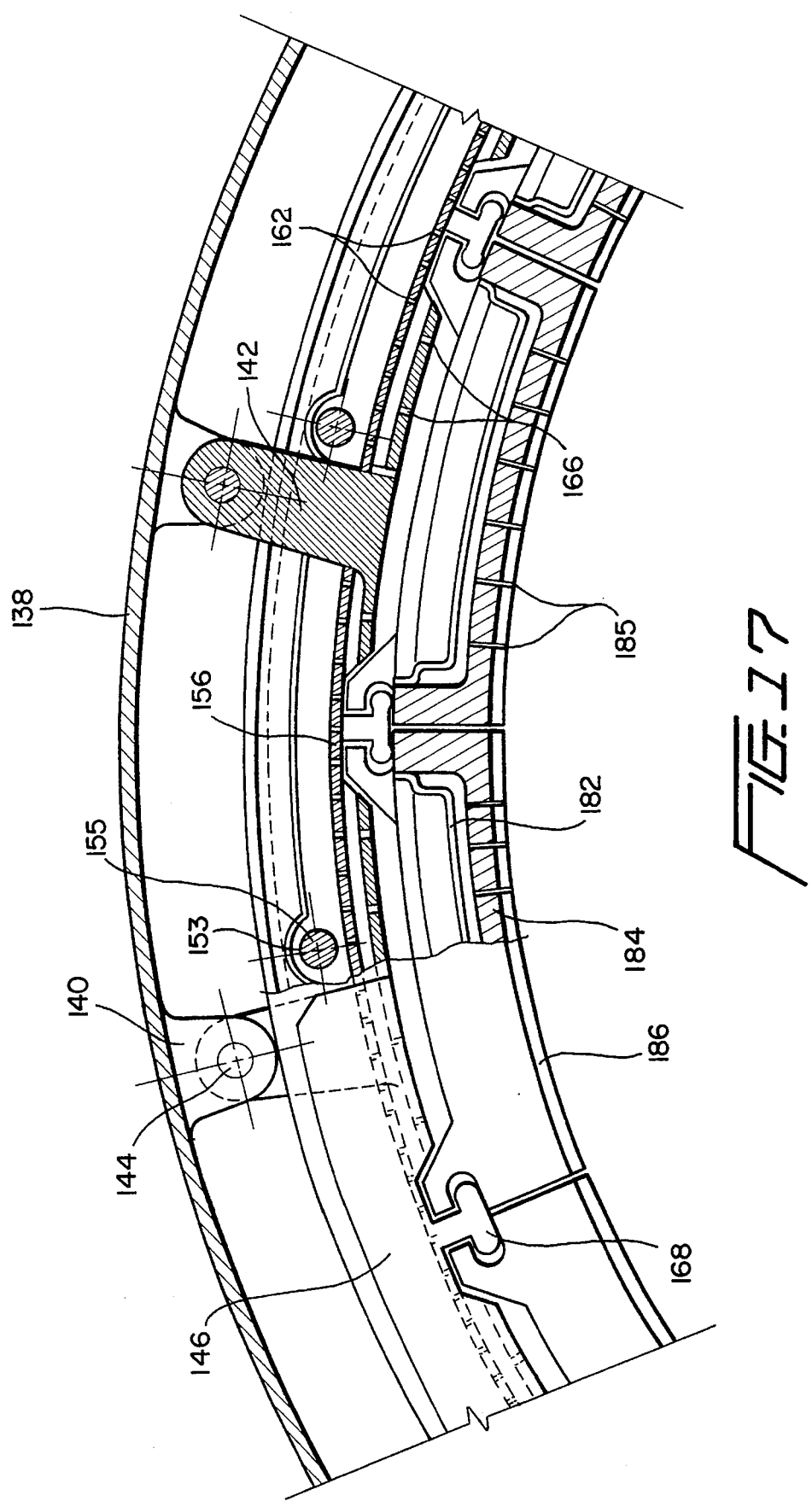
FIG. 17 is a partial, sectional view taken along lines XVII—XVII in FIG. 16.

FIGS. 16 and 17 disclose a third embodiment of a sealing device according to the invention wherein the long response time ring is formed integrally with the casing shroud, as in the second embodiment, and in which the short response time ring is also located interiorly of the long response time ring. External ring and casing 138 has a plurality of female clevises formed at spaced apart locations about its internal surface. Pins 144 hingedly attach male clevises 142 to each of the clevises 140, clevises 142 being a part of the displacement element 146. As best seen in FIG. 16, the displacement elements 146 are formed with an inverted "T" cross section. The ends of transverse bar 143 have upstream flanges 148 and downstream flanges 150 as shown. These upstream and downstream flanges define bores 153 through which bolts 155 hingedly attach short response time ring 156. Ring 156 has a monolithic structure with upstream and downstream stiffeners 158 and 160 and defines a plurality of holes 162. Heat exchange accelerators such as wedges or fins may be incorporated in the structure of ring 156, if desired. Male clevis 142 of displacement element 146 passes through flanged recesses 164 of ring 156 with minimal clearance. Transverse bar 143 also defines a plurality of calibrated holes 166.

Displacement elements 146 have double tenons 168 which are located on the bisector of an angle, the apex of which lies upon the axis of the gas turbine engine and the sides of which pass through the axes of hinge pins 144 and 155. As in the previous embodiments, the positions of the double tenons 168 can be optimized to insure a very small, positive clearance between the sealing sectors and the blade tips in both steady state and transient modes of operation.

The third embodiment is distinguished from the first two embodiments by the manner in which the device is supplied with ventilating air. Instead of drawing the air from one of the compressor stages via external piping, ventilating air is taken from space 200 (see FIG. 16) exterior to the combustion chamber via a plurality of regularly spaced holes 170 in upstream radial flange 172. Upstream flange 172 is fastened to casing 138 by known fasteners indicated schematically at 174. Downstream radial flange 176 is similarly fastened to casing 138 by fastener 178.

Seals 180 and 180' between the external fins of ring 156 and the aforementioned upstream and downstream flanges 172 and 176 prevent leaks of the ventilating air from chamber 179. The ventilating air passes from chamber 189 through holes (not shown) in cover 181 to regulate, by impact, the temperature of ring 156. As noted above, this ring 156 has a short response time, being on the order of seven seconds.

The ventilating air, after flowing through transverse bars 143 via holes 166, passes through a second annular cover 182 via holes (not shown) to cool sealing sectors 184. Sealing sectors 184 as well as wear packing 186 have a plurality of holes 185 through which the ventilating air exhausts into the gas turbine engine's gas stream. The orientation of holes 185 is selected such that the ventilating air has minimal effect on the engine's gas stream in the vicinity of the internal wall of packing 186. The holes are formed on an axis oriented obliquely to the axis of the engine in both longitudinal and peripheral directions. The peripheral obliqueness may be equivalent to the mean obliqueness of the flux of hot gases in the vicinity of internal wall of packing 186.

It is understood that, although the casing ring 138 has a relatively long temperature response time due to its thermal inertia, the response time can be adjusted by cover rings, such as 188, or the addition of heat insulating materials to the internal or external surfaces. Ring 156 has a monolithic structure with a relatively high mechanical inertia due to the presence of flanges 158 and 160, but has a relatively low thermal inertia and a short response time. Its response time can be adjusted by heat exchange accelerators, such as holes 162 or wedges and fins (not shown). The external sealing of the device and the longitudinal expansion of flanges 172 and 176 may be accommodated by known means.

The operation of this embodiment and the methods for determining its optimal parameters are exactly the same as those previously described. The operation of this embodiment will be described in reference to FIGS. 16 and 17 during the acceleration from a stabilized idling speed mode to a stabilized full throttle speed mode. During the initial, short duration phase, after the throttle is opened (approximately seven seconds) the engine will come up to full throttle speed. During this time, the compressed air flowing downstream in space 200 between the combustion chamber and the exterior casing will pass through holes 170 into chamber 179 and subsequently through holes in cover 184 thereby causing the temperature of the short response time ring 156 to rise. Since hinge pin 144, affixed to the long response time ring 138, remains stationary during this initial phase, the expansion of ring 156 will displace hinge pins 155 radially outwardly, thereby causing displacement elements 146 to pivot about hinge pins 144. Double tenons 168 will thereby be displaced radially outwardly causing a consequent increase in the radial dimension defined by sealing sectors 184.

By adjusting the heat exchange accelerators, the coefficient of thermal expansion for the rings $\alpha_v$, and by choosing a suitable location for the position of double tensions 168, it is possible to insure that the sealing surface defined by sectors 184 follows the increase in radius of the blade tips during this initial phase.

During the second phase in which thermal stabilization of the engine takes place, usually in about ten minutes, external ring 138 also reaches its stabilized temperature. During this long term expansion of external ring 138, hinge pins 155 are effectively fixed and the radially outward displacement of hinge pin 144 causes displacement elements 156 to rotate about hinge pin 155 (counterclockwise as seen in FIG. 17). This also serves to double tenons 168 outwardly thereby increasing the downward displacement of sealing sectors 186 to accommodate the long range, thermal expansion of the turbine wheel. By properly selecting the thermal inertia, and the coefficient of thermal expansion $\alpha_e$ for external ring 138, in addition to a suitable location for the tenons, it is possible to insure that the sealing sectors 184 are displaced outwardly to follow the increas in radius of the blade tips during the second phase of their expansion.

Certain modifications to this embodiment, such as reversing the positions of male and female clevises 142 and 140 and substituting ball joints for hinge pins 144 and 155 can be made without exceeding the scope of the invention.

Figure 20:
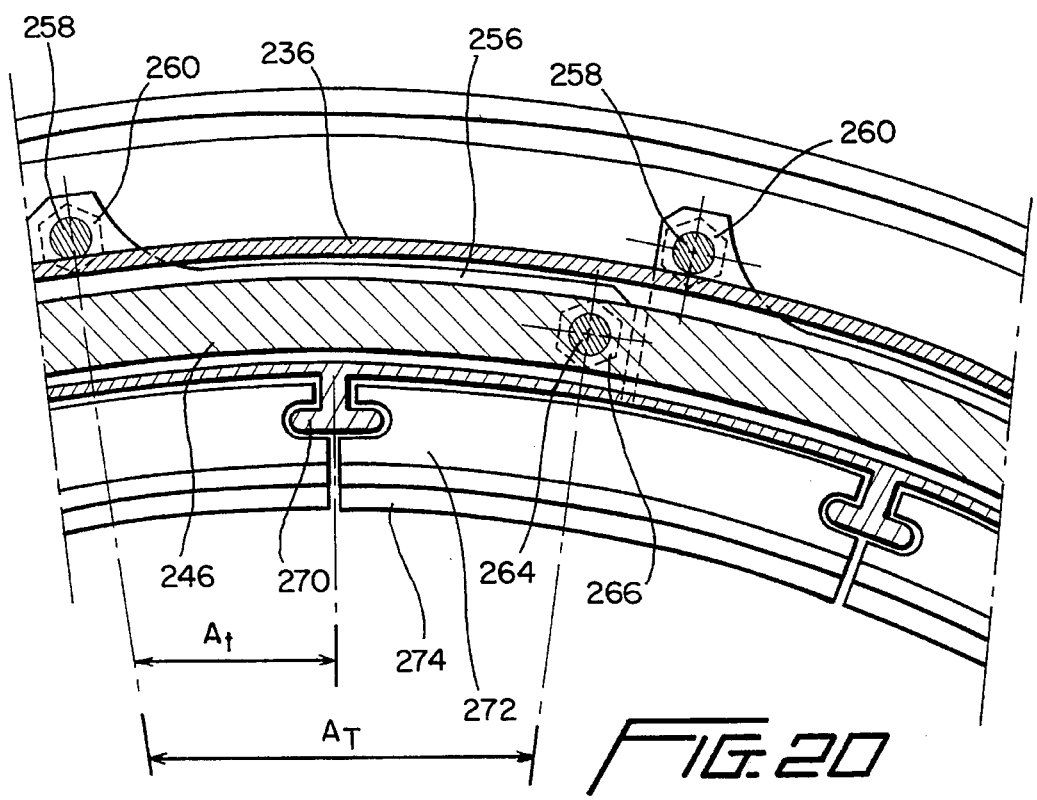
FIG. 20 is a partial sectional view, taken also along lines XIX—XIX in FIG. 18 illustrating the relationship between the hinge pivot axes and the double tenons.
Figure 18:
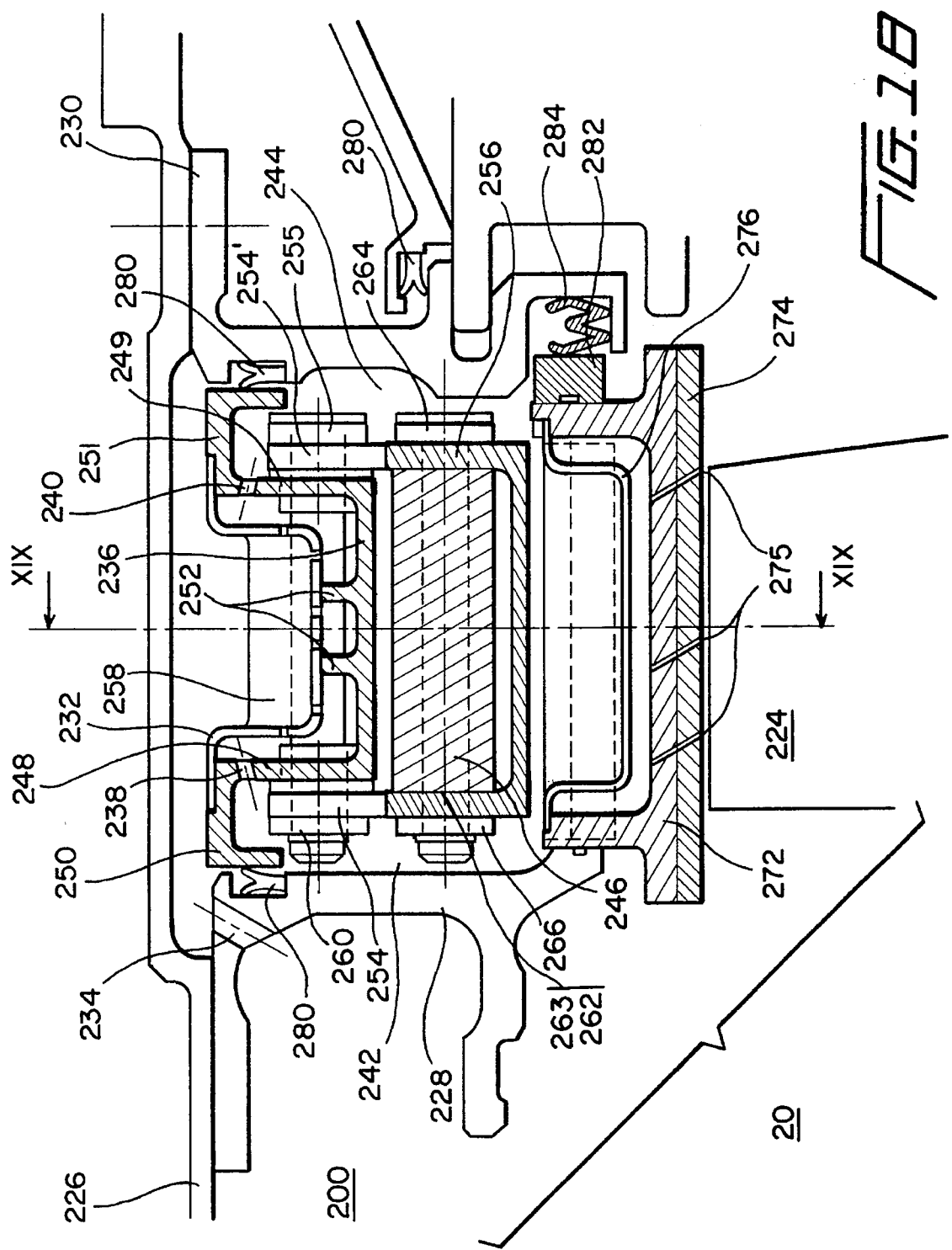
FIG. 18 is a partial, sectional side view showing a sealing device according to a fourth embodiment of the invention.
Figure 19:
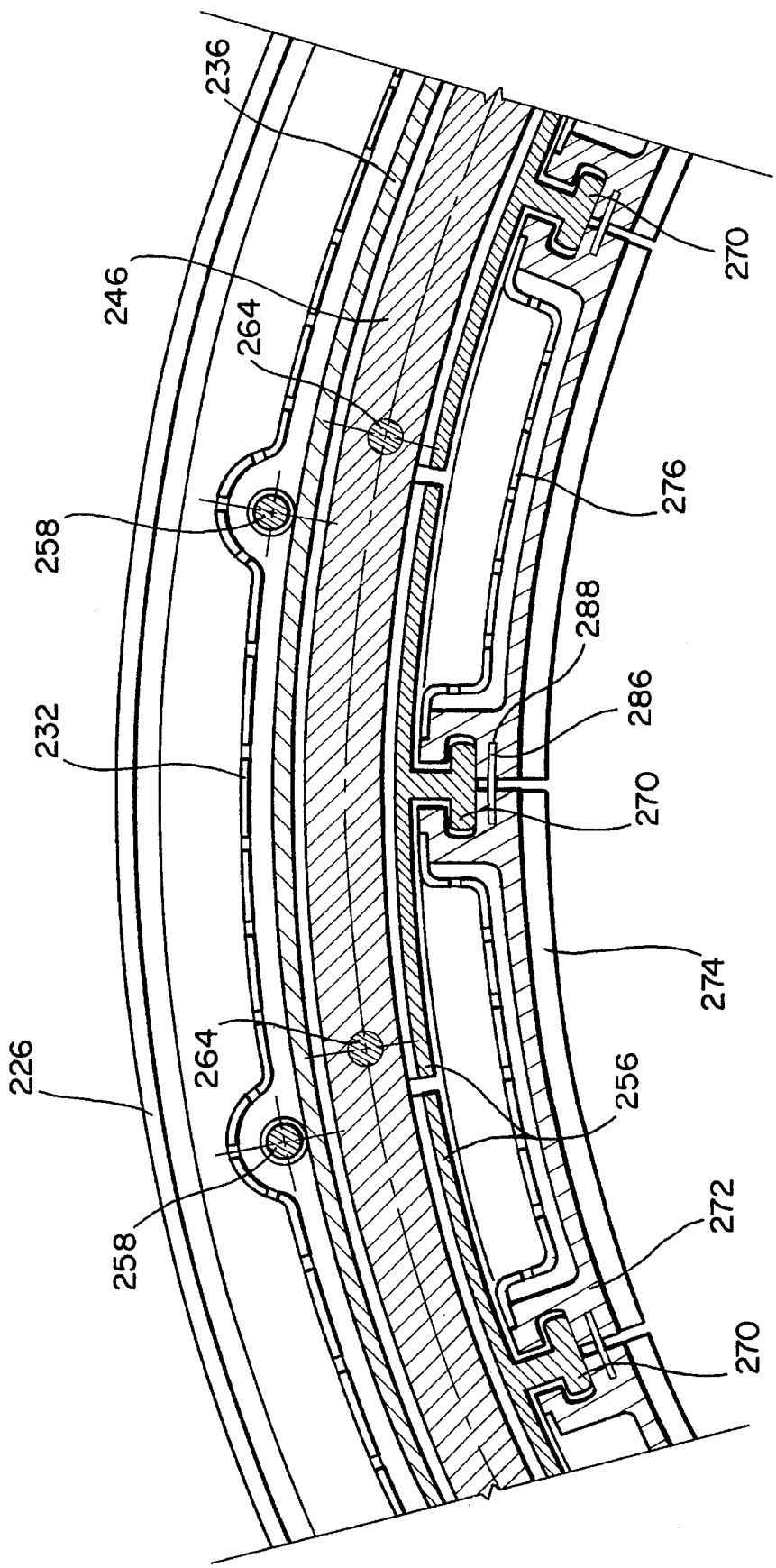
FIG. 19 is a sectional view taken along lines XIX—XIX on FIG. 18.

FIGS. 18, 19 and 20 show a fourth embodiment of the invention, one which is particularly designed to be adapted to existing gas turbine engines, in the form of an improvement kit, without necessitating significant modifications to the engine structure. As in the previous embodiment, exterior piping is eliminated by taking the ventilating air from the space between the combustion chamber and the engine casing. In this embodiment, contrary to those embodiments previously discussed, the short term response ring is located externally of the long time response ring.

As shown in FIG. 18, the clearance maintenance device 20 is located within turbine casing 226 immediately adjacent to blade tip 224. Annular flange members 228 and 230 are secured to engine casing 226 by known means and are located upstream and downstream, respectively, of clearance device 20. Flange 228 defines a plurality of holes 234 at regularly spaced intervals around its periphery.

Short term response ring 236, having cover ring 232 attached thereto is oriented radially outwardly of long response time ring 246. The rings are connected by displacement elements 256 carrying sealing sectors 272 on double tenons 270. Sealing sectors 272 each have a packing surface 274 to effect the sealing of blade tips 224. Upstream and downstream chambers 242 and 244 are defined between upstream flange 228, downstream flange 230 and the clearance device 20. Short response time ring 236 has upstream and downstream radial flanges 248 and 249, respectively, which define upstream and downstream air holes 238 and 240, respectively. Longitudinal flanges 250 and 251 extend in the upstream and downstream directions from radial flanges 248 and 249. In addition, intermediate radial flanges 252 may be provided on short response time ring 236, these also functioning as heat exchange fins to accelerate the heat transfer between the ventilating air and the ring structure.

The dimensions of short response time ring 236 are chosen such that it has the same temperature response time to acceleration (or deceleration) as the turbine wheel and the blade for centrifugal expansion (or contraction) plus the thermal expansion of the blade.

Upstream and downstream radial flanges 248 and 249 also define a plurality of longitudinal holes regularly spaced about its periphery which correspond to holes 254 and 254' formed in the radial flanges of U-shaped displacement elements 256. Pins 258 are inserted through these aligned holes and retained in position by nuts 260, cotter pins or the like. This serves to hingedly attach the displacement elements 256 to the short response time ring 236.

Displacement elements 256 also define holes 262, similar to holes 254, which are aligned with corresponding holes 263 passing longitudinally through long response time ring 246. Bolts or pins 264 are inserted through these aligned holes and held in place by nuts 266, cotter pins or the like. This serves to hingedly attach the other end of displacement elements 256 to long response time ring 246.

Displacement elements 256 also have double tenons 270 which serve to attach sealing sectors 272 having packing surface 274 as previously described. Although, as shown in FIGS. 19 and 20, the double tenons are located on the bisector of an angle whose apex is on the longitudinal axis of the engine and whose sides pass through the axes of pins 258 and 264, other positions may be chosen in order to optimize the operating conditions of the device.

As best seen in FIG. 18, ventilating air from space 200 flows through holes 234 and holes in cover 258 (not shown) to impact upon short response time ring 236. The air passes into chamber 242 via holes 238, and into chamber 244 through holes 240 thus contacting long response time ring 246. As in the previous embodiments, it is possible to attach heat insulating layers to long response time ring 246 in order to achieve the optimum operating conditions for a particular engine's characteristics.

The air from chambers 242 and 244 flows between displacement elements 256 and sealing sectors 272 through holes in cover ring 276 (not shown). The ventilating air then passes through passages 275 formed in sectors 272 to flow around the packing 274 to maintain it at acceptable operating temperatures. Passages 275 may be oriented obliquely in both the radial and peripheral directions to minimize the disturbance to the gases passing through the turbine.

The sealing between the clearance maintenance device 20 and the fixed structure of the engine casing may be achieved by any known means, such as by flexible annular metallic packing having a V or ω-shape, such as 280 or by a ring seal 282 maintained in sealing position via omega-shaped spring 284. The sealing between adjacent sealing sectors 272 can be effected by the means previously described in relation to the other embodiments. As shown in FIG. 19, shims 286 may be inserted in correspondingly aligned slots 288 in adjacent sectors to seal the gap between them.

During the acceleration of the engine from a stabilized idling mode to a full throttle mode the device 20 maintains a small positive clearance between packing 274 and blade tips 224. As in the previous embodiments, the ventilating air impacting upon short response time ring 236 causes the radially outward movement of hinge pins 258 which, in turn, causes the displacement element 256 to pivot about relatively fixed hinge pins 264. This moves each of the double tenons and, consequently, the sealing sectors 274, in a radially outwardly direction to accommodate for the initial thermal and centrifugal expansion of the turbine blade and wheel.

Continued exposure of long response time ring 246 to the ventilating air also causes it to expand, but at a much slower rate than ring 236. Thus, the long term expansion of this ring causes movement of hinge pins 264 in a radially outward direction thereby causing displacement elements 256 to pivot about hinge pins 258. This causes additional radially outward movement of sealing sectors 272, via double tenons 270, to accommodate for the thermal expansion of the rim and hub of the turbine wheel.

It is understood that during deceleration of the gas turbine, the operations of the device are similar, but in the opposite direction. Upon initial deceleration, short response time ring 236 contracts during the same time that centrifugal contraction of the turbine wheel and blades and the thermal contraction of the blades takes place. This causes hinge pins 258 to be moved radially inwardly and a consequent displacement of displacement element 256 thereby causing the inward movement of sealing sectors 272. After this initial phase, long response time ring 246 contracts thereby causing the radially inward movement of hinge pin 264 and pivoting movement of displacement elements 256 about hinge pins 258. This causes additional radially inward movement of sealing sectors 274 to accommodate for the thermal contraction of the turbine wheel and hub.

It is understood that means for centering external short response time ring 236 and internal long response time ring 246 are provided to keep the ring centered within casing 226 in both the stabilized and transient modes. These centering means may be at least three approximately tangential drive rods spaced peripherally in an approximately regular arrangement and connecting at ring 236 at two points longitudinally spaced, preferably upstream and downstream from the ring. The pins hinging these rods to the ring 236 may be hinge pins 258. Alternatively, there may be at least three pins fixed radially in the casing 226 facing inwardly and located in bores in ring 236 so as to maintain the concentricity of the ring. The means for centering the ring within the casing are well known to those skilled in the art and any means may be employed without exceeding the scope of the invention.

Since external short response time ring 236 is centered within casing 226 and, since the displacement of each of the displacement elements 256 is the same, internal, long response time ring 246 is also centered whether the engine is in a stabilized or transient operating mode.

In the embodiment shown in FIGS. 18–20, double tenons 270 are located on the bisector of an angle, the apex of which is on the axis of the gas turbine engine and the sides of which pass through the axes of hinge pins 258 and 264. This corresponds to the optimum position when there is equality between the centrifugal expansions (or contractions) of the turbine wheel and blades, augmented by the thermal expansion (or contraction) of the blades during the first phase of acceleration (or deceleration) and the thermal expansion (or contraction) of the turbine wheel during its thermal stabilization. If such is not the case, the peripheral position of the double tenons 270 can be according to the ratio of angles:

$$A\ tenon/A\ total = At/AT$$

(See FIG. 20) which is in the ratio of expansions (or contractions) of the blade tips during the first phase to the total expansion (or contraction).

By varying the coefficients of thermal expansion $\alpha_1$, $\alpha_2$, of the short time and long time response rings, the location of the double tenons (A tenon), the radii of rings 236 and 246, the flow rates of ventilating air (by varying holes 238 and 240 as well as those through cover ring 232 and cover ring 276) and the thermal inertias of rings 236 and 246 (with heat accelerators of heat retarders) it is possible to control the effective radii of displacement of the sectors within very broad limits in both the stabilized and transient operating modes.

It is possible to first determine the position of double tenons 270 and to choose the coefficients of thermal expansion, $\alpha_1$, $\alpha_2$, and the radii of rings 236 and 246. Or on the contrary, it is possible to select the coefficients of expansion $\alpha_1$ for ring 246 and $\alpha_2$ for ring 236 and their radii and to secondarily select the peripheral location of the tenons. In either case, the response time for rings 236 and 246 may be adjusted by heat exchange accelerators (for ring 236) or by heat insulating materials (for ring 246) to adjust their thermal inertia.

Figure 21:
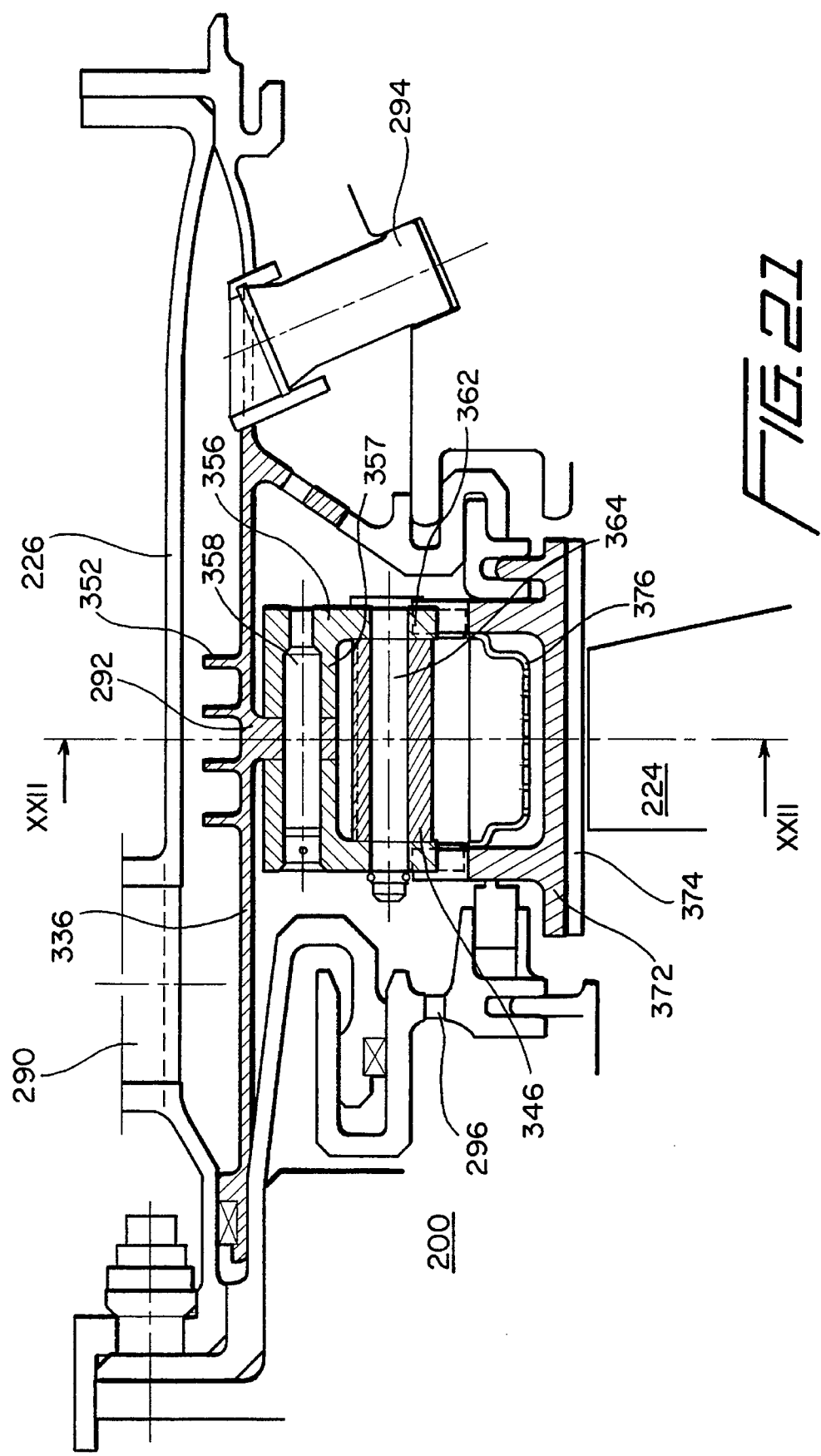
FIG. 21 is a partial side sectional view corresponding to FIG. 3 showing a fifth embodiment of the sealing device according to the invention.
Figure 22:
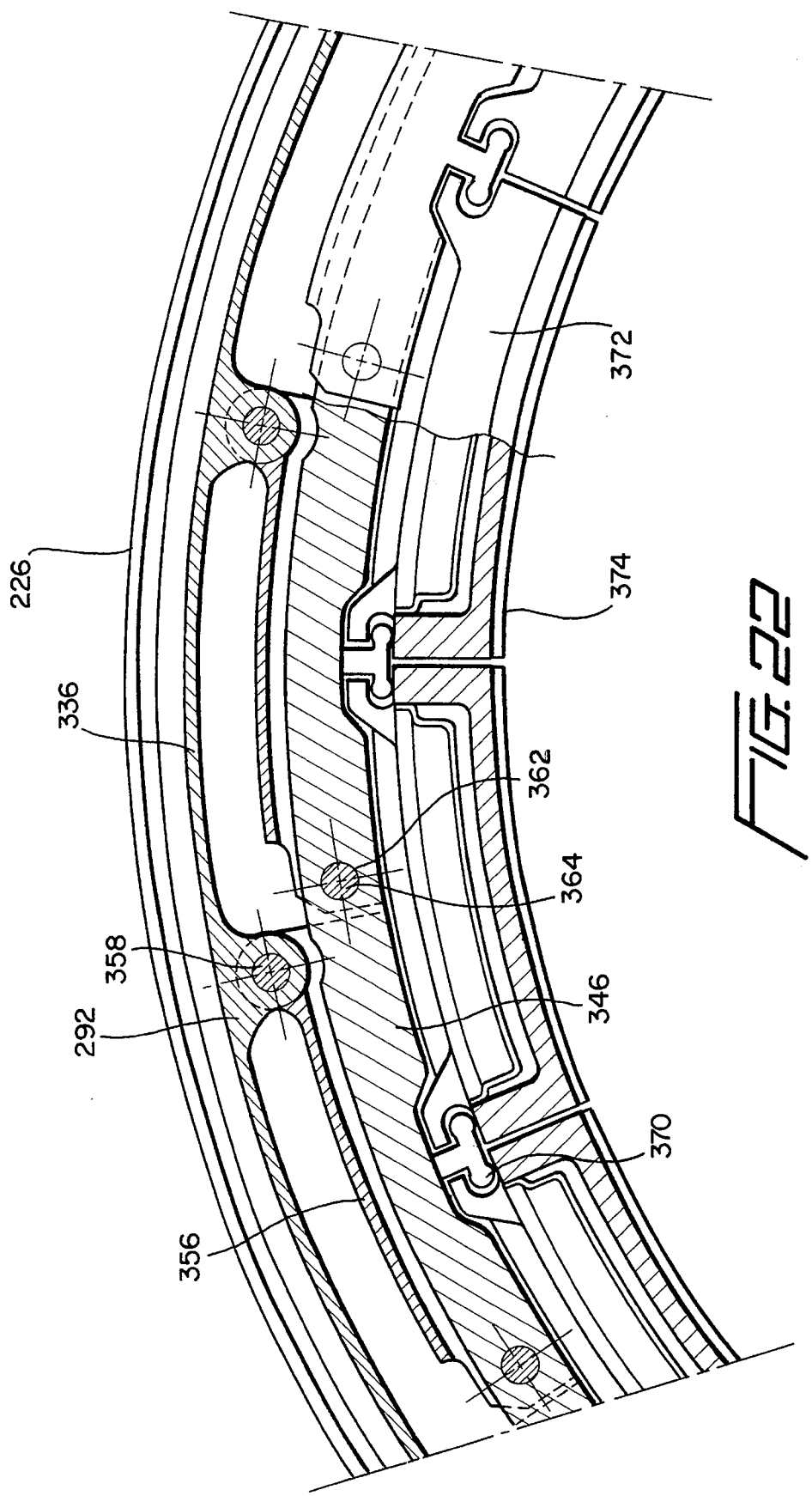
FIG. 22 is a sectional view taken along lines XXII—XXII in FIG. 21.

A fifth embodiment of the invention is shown in FIGS. 21 and 22 wherein, as in the fourth embodiment, the short response time ring is located externally to the long response time ring. As best seen in FIG. 21, the ventilating air passes through a plurality of inlets 290 located peripherally about the engine structure into the interior of turbine casing 226. The air may be taken form a stage of the compressor and piped to each of the inlets 290. This air passes between turbine casing 226 and short response time ring 336 and exits via spools 294. Contrary to the previously discussed embodiments, in this embodiment the ventilating air supplied through ducts 290 contacts only the short response time ring 336 and does not contact the long response time ring 346.

Short response time ring 336 is attached to the turbine casing 226 at upstream and downstream locations such that its center portion may radially expand and contract. Radial ribs 352 may be provided on the exterior surface of ring 336 to facilitate the heat transfer between this portion of the ring and the ventilating air.

Short response time ring 336 carries a plurality of male clevises 292 spaced at various points about its periphery and facing radially inwardly. Displacement elements 356 are hingedly attached to each of these clevises via female clevises 357 and hinge pins 358. Displacement elements 356 are U-shaped, but the legs of the U face radially inwardly, not outwardly as in the previous embodiments.

Air drawn from space 200 externally of the combustion chamber passes through holes 296 and contacts the assembly of displacement elements 356 and long response time ring 346. This air passes between displacement element 356, sealing sectors 273 and through holes in cover 376 (not shown) to improve the cooling of sectors 372 and packing 374.

Displacement elements 356 have holes 362 which are aligned with corresponding holes in long response time ring 346. Hinge pins 364 are inserted through these corresponding holes to hingedly attach long response time ring 346 to displacement elements 356.

The operation of this embodiment is similar to that of the fourth embodiment. Upon acceleration of the engine from a stabilized idling speed mode, the short response time ring 336 will rise in temperature due to its contact with ventilating air from inlets 290. This will cause radial expansion of the ring 336 and consequent radially outward movement of hinge pins 358 causing the displacement elements to pivot slightly in a counterclockwise direction (as seen in FIG. 22) about hinge pin 364. This movement will cause the radial outward movement of double tenons 370 along with sealing sectors 372 in order to accommodate for the centrifugal expansion of the turbine wheel and blade and the thermal expansion of the blade during this initial phase of the acceleration. During the second phase, the thermal stabilization of the turbine wheel, long response time ring 346 will expand to cause radially outward movement of hinge pin 364 thereby causing double tenons 370 to move further radially outwardly via the connection with displacement elements 356.

The sealing of the upstream and downstream ends of the clearance device are shown in FIG. 21 and may comprise a system of male and female flanges to permit radial and longitudinal sliding motion without the introduction of hyperstatic forces. It is understood that known seals, described in the previous embodiments, can also be used with this embodiment.

The advantages of the fifth embodiment has the advantage that the displacement elements are hinged at three points, instead of four thereby minimizing the risk of jamming which may be caused by an accumulation of manufacturing tolerances. Furthermore, the systems regulating the stabilized and transient temperatures of the short response time ring and the long response time ring are separated thereby giving an additional parameter in the system optimization, i.e. by selecting the compressor stage from which the air is withdrawn and exposed to ring 336 independently of the temperature of the air influencing the long response time ring 346.

Although many embodiments of the invention have been described, they all permit real time and maintenance of clearance between the sealing sectors and the blade tips in both stabilized and transient engine operating mode by providing:

- a ring with high mechanical inertia and short thermal response time to compensate for the radial displacement of the blade tips due to the centrifugal expansion of the wheel and the blade as well as the thermal expansion of the blade upon engine acceleration (and contraction upon deceleration);

- a ring having mechanical inertia and high thermal inertia to slowly compensate for the relatively slower thermal expansion of the turbine wheel;

- connecting these two rings by a multiplicity of members hinged at one side to one of the rings and at its other side to the other ring such that the thermal expansions of the rings takes place without the introduction of hyperstatic forces in any of the parts;

- insuring homogeneous ventilation around the periphery for each of the members comprising the device; and

- regulating the position of sealing sectors to the position of the hinged members such that the displacement of tenons attached to the sealing sectors, in a radial direction, $\Delta r_t$, is, at any moment, the linear combination of the increase (or reduction) in the radius of the internal structure, $r_i$, and the increase (or decrease) in the radius of the external structure, $r_e$, according to the equation:

$$\Delta r_t = \eta r_i + (l-\eta) \Delta r_d$$

$\eta$ is a coefficient that depends on the angular position of the tenons with respect to the axes of the displacement element hinges.

The description of the foregoing embodiments is presented merely for illustrative purposes only and should not be construed as in any way limiting the invention, the scope of which is defined solely by the appended claims.

We claim:

1. A device for maintaining a small positive clearance from turbine blade tips of a rotating turbine wheel in a gas turbine engine under stabilized and transient engine operating modes comprising:

a) a short response time ring located generally coplanar with the turbine wheel;

b) a long response time ring located generally coplanar with the turbine wheel;

c) a plurality of displacement elements pivotally attached to the short response time ring and the long response time ring;

d) sealing sectors attached to the displacement elements, the sealing sectors forming a sealing ring disposed around the turbine wheel a predetermined distance from the blade tips; and e) means to supply ventilating air to the short response time ring and the long response time ring such that the rings expand as the turbine wheel speed increases and contract as the turbine wheel speed decreases thereby causing the sealing ring to expand or contract to maintain the predetermined distance from the blade tips.

2. The device according to claim 1 further comprising:

a) double tenons attached to each displacement element, each side of the double tenons engaging grooves defined by each end of adjacent sealing sectors to attach them to the displacement elements; and b) sealing means provided between adjacent sealing sectors to prevent leakage of gases passing through the turbine therethrough.

3. The device according to claim 2 wherein a casing of the gas turbine engine has radially inwardly extending flanges on upstream and downstream sides of the device, and further comprising second sealing means between the sealing sectors and the flanges to prevent radial leakage of gases passing through the turbine.

4. The device according to claim 3 further comprising:

a) first hinge pin means pivotally attaching first ends of the displacement elements to the short response time ring; and b) second hinge pin means pivotally attaching second ends of the displacement elements to the long response time rings.

5. The device according to claim 4 wherein the center of the double tenons is located on the bisector of an angle whose apex is coincident with the rotational axis of the turbine wheel and whose sides extend through the axes of the first and second hinge pin means.

6. The device according to claim 4 wherein the short response time ring is located radially inwardly of the long response time ring.

7. The device according to claim 6 wherein the means to supply ventilating air comprises duct means having one end attached to a compressor stage of the gas turbine engine and a second end attached to the engine casing so as to direct air into contact with the short response time ring and the long response time ring.

8. The device according to claim 7 wherein the displacement elements have a generally U-shaped cross section, the sides of the U extending radially outward on the upstream and downstream sides of the short response time ring and the long response time ring.

9. The device according to claim 8 wherein the duct means includes a plurality of hollow spools extending through the external, long response time ring to direct ventilating air into an annular space between the long response time ring and the short response time ring.

10. The device according to claim 9 wherein the duct means and plurality of spools are equidistantly spaced around the circumference of the long response time ring so as to evenly distribute the ventilating air and achieve a homogeneous temperature change of the short response time ring and the long response time ring.

11. The device according to claim 10 wherein the short response time ring comprises:

a) a generally U-shaped internal ring having the sides of the U shape extending radially outwardly, the sides defining a plurality of holes therethrough for the passage of ventilating air, the center portion of the base of the U also defining a plurality of holes therethrough for the passage of ventilating air;

b) a plurality of baffles extending radially outwardly from the base of the U-shaped internal ring, the baffles defining a plurality of holes therethrough for the passage of ventilating air; and c) a cover ring extending across the sides of the U-shaped ring and the baffles, the cover ring defining a plurality of holes therethrough to allow passage of ventilating air into the U-shaped ring.

12. The device according to claim 11 further comprising a layer of heat insulating material attached to the long response time ring.

13. The device according to claim 12 wherein the engine casing defines a plurality of inwardly facing, longitudinally extending grooves and the long response time ring further comprises a plurality of longitudinal studs slidably retained in the longitudinally extending grooves so as to prevent relative rotation between the casing and the long response time ring and allow relative radial movement due to the expansion and contraction of the ring.

14. The device according to claim 12 wherein the engine casing and the long response time ring each define a plurality of co-aligned holes and further comprising pins passing through the co-aligned holes so as to prevent relative rotation between the casing and the long response time ring and allow relative radial movement due to the expansion and contraction of the ring.

15. The device according to claim 12 further comprising:

a) means to attach the long response time ring to radially outwardly extending upstream and downstream flanges of the engine casing; and b) a second, exterior cover ring attached to the short response time ring so as to define an annular space exteriorly of the cover ring, the exterior cover ring having a pluarlitu of openings connected to the hollow spools so as to direct ventilating air into the annular space.

16. The device according to claim 12 wherein the duct means comprises:

a) a ventilating air manifold connected to the plurality of hollow spools;

b) a first, smaller diameter duct connected between the compressor stage and the manifold;

c) a second, larger diameter duct connected between the compressor stage and the manifold;

d) valve means in the second duct; and e) means to control the valve means.

17. The device according to claim 6 wherein the coefficient of thermal expansion of the short response time ring is greater than the coefficient of thermal expansion of the long response time ring.

18. The device according to claim 6 wherein the long response time ring is formed integrally with the engine casing.

19. The device according to claim 18 wherein the upstream radially inwardly extending flange defines a plurality of circumferentially spaced holes allowing passage of ventilating air from a space adjacent a combustion chamber of the engine into a chamber defined by the long response time ring, the short response time ring, the upstream flange and the downstream flange.

20. The device according to claim 19 wherein the displacement elements have a generally T-shaped cross section, the base of the T being pivotally attached to the long response time ring, the cross piece of the T being pivotally attached to the short response time ring.

21. The device according to claim 20 wherein the short response time ring has a generally U-shaped cross section, the base of the U defining a first plurality of hoes to allow passage of ventilating air therethrough, and a second plurality of openings to slidingly engage the bases of the T-shaped displacement elements.

22. The device according to claim 4 wherein the short response time ring is located radially outwardly of the long response time ring.

23. The device according to claim 22 wherein the displacement elements have a generally U-shaped cross section.

24. The device according to claim 23 wherein the sides of the U-shaped cross section extend radially outwardly.

25. The device according to claim 24 wherein the short response time ring comprises:
a) a generally U-shaped internal ring having the sides of the U shape extending radially outwardly, the sides defining a plurality of holes therethrough for the passage of ventilating air, the center portion of the base of the U also defining a plurality of holes therethrough for the passage of ventilating air;
b) a plurality of baffles extending radially outwardly from the base of the U-shaped internal ring, the baffles defining a plurality of holes therethrough for the passage of ventilating air; and
c) a cover ring extending across the sides of the U-shaped ring and the baffles, the cover ring defining a plurality of holes therethrough to allow passage of ventilating air into the U-shaped ring.

26. The device according to claim 25 wherein the upstream radially inwardly extending flange defines a plurality of circumferentially spaced holes allowing passage of ventilating air from a space adjacent a combustion chamber of the engine into a chamber defined by the engine casing, the short response time ring, the upstream flange and the downstream flange.

27. The device according to claim 22 wherein the coefficient of thermal expansion of the short response time ring is greater than the coefficient of thermal expansion of the long response time ring.

28. The device according to claim 23 wherein the sides of the U-shaped cross section extend radially inwardly.

29. The device according to claim 28 further comprising means to fasten the upstream and downstream edges of the short response time rings to the engine casing such that a center section of the ring may move radially with respect to the casing.

30. The device according to claim 29 wherein the means to supply ventilating air comprises:
a) first air supply means to supply ventilating air to contact the short response time ring; and
b) second air supply means to supply ventilating air to contact the long response time ring.

31. The device according to claim 30 wherein the first air supply means comprises duct means having one end attached to a compressor stage of the gas turbine engine and a second end attached to the engine casing so as to direct ventilating air into contact with the short response time ring.

32. The device according to claim 31 further comprising a plurality of hollow exhaust spools communicating with a chamber defined between the engine casing and the short response time ring to exhaust ventilating air therefrom downstream of the turbine wheel.

33. The device according to claim 32 wherein the upstream radially inwardly extending flange of the engine casing defines a plurality of circumferentially spaced holes allowing passage of a second supply of ventilating air from a space adjacent a combustion chamber of the engine onto the long response time ring.

34. The device according to claim 4 wherein each sealing sector is formed with an initial radius of curvature ($R_{vco}$) according to the equation:

$$R_{vco} = R_{vo} + \Delta R_{vj} - \Delta R_{vcj}$$

where:
$R_{vo}$=the mean radius of the circle defined by the sectors at rest;
$\Delta R_{vj}$=the variation ($R_{vj}-R_{vo}$) in the mean radius of a sector between the rest state and an intermediate state (j) at a selected operating point in the operating cycle of the gas turbine engine; and
$\Delta R_{vcj}$=the variation in the radius of the curvature of the sector between the rest state and the intermediate (j) state.

* * * * *